United States Patent
Byun et al.

(10) Patent No.: US 10,952,045 B2
(45) Date of Patent: Mar. 16, 2021

(54) METHOD AND DEVICE FOR TRANSMITTING RELAY SIGNAL FOR V2X COMMUNICATION IN WIRELESS COMMUNICATION SYSTEM

(71) Applicant: LG Electronics Inc., Seoul (KR)

(72) Inventors: Ilmu Byun, Seoul (KR); Heejin Kim, Seoul (KR); Jiwon Kang, Seoul (KR); Youngtae Kim, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 16/341,507

(22) PCT Filed: Jul. 18, 2017

(86) PCT No.: PCT/KR2017/007689
§ 371 (c)(1),
(2) Date: Apr. 12, 2019

(87) PCT Pub. No.: WO2018/070645
PCT Pub. Date: Apr. 19, 2018

(65) Prior Publication Data
US 2019/0306678 A1    Oct. 3, 2019

Related U.S. Application Data

(60) Provisional application No. 62/408,033, filed on Oct. 13, 2016, provisional application No. 62/424,542, filed on Nov. 20, 2016.

(51) Int. Cl.
*H04L 5/00* (2006.01)
*H04L 27/26* (2006.01)
(Continued)

(52) U.S. Cl.
CPC ............. *H04W 4/40* (2018.02); *H04L 1/0061* (2013.01); *H04L 5/00* (2013.01); *H04L 5/0055* (2013.01);
(Continued)

(58) Field of Classification Search
CPC .... H04B 7/18513; H04W 4/08; H04W 24/10; H04W 4/00; H04W 72/1231
See application file for complete search history.

(56) References Cited

U.S. PATENT DOCUMENTS

| 8,995,662 B2 | 3/2015 | Rubin et al. |
| 2015/0163770 A1 | 6/2015 | Guo et al. |

(Continued)

FOREIGN PATENT DOCUMENTS

WO    2016/018069 A1    2/2016

*Primary Examiner* — Iqbal Zaidi
(74) *Attorney, Agent, or Firm* — Dentons US LLP

(57) ABSTRACT

Provided are a method for transmitting a relay signal for V2X communication in a wireless communication system and a device using the same. Specifically, a terminal receives allocation information of a first relay resource and a second relay resource for a communication group from a base station. A first terminal receives a data signal through a reception beam for the first relay resource from a second terminal. The first terminal transfers the data signal to a third terminal through a transmission beam for the first relay resource. Further, the first terminal transmits an ACK/NACK for the data signal to the second terminal through a transmission beam for the second relay resource. The reception beam for the first relay resource is symmetrical to the transmission beam for the second relay resource. The transmission beam for the first relay resource is symmetrical to a reception beam for the second relay resource.

18 Claims, 20 Drawing Sheets

(51) Int. Cl.
  *H04W 72/04* (2009.01)
  *H04W 88/04* (2009.01)
  *H04W 4/40* (2018.01)
  *H04W 76/11* (2018.01)
  *H04L 1/00* (2006.01)

(52) U.S. Cl.
  CPC ......... *H04L 27/2607* (2013.01); *H04W 72/04* (2013.01); *H04W 72/046* (2013.01); *H04W 72/0446* (2013.01); *H04W 76/11* (2018.02); *H04W 88/04* (2013.01); *H04L 5/0007* (2013.01)

(56) References Cited

U.S. PATENT DOCUMENTS

| | | | |
|---|---|---|---|
| 2015/0195827 A1 | 7/2015 | Feng et al. | |
| 2016/0212596 A1 | 7/2016 | Brahmi et al. | |
| 2018/0206139 A1* | 7/2018 | Wang | H04B 7/15507 |
| 2018/0288588 A1* | 10/2018 | Uchiyama | H04W 4/40 |
| 2019/0004179 A1* | 1/2019 | Hwang | H04B 7/185 |

* cited by examiner

FIG. 12
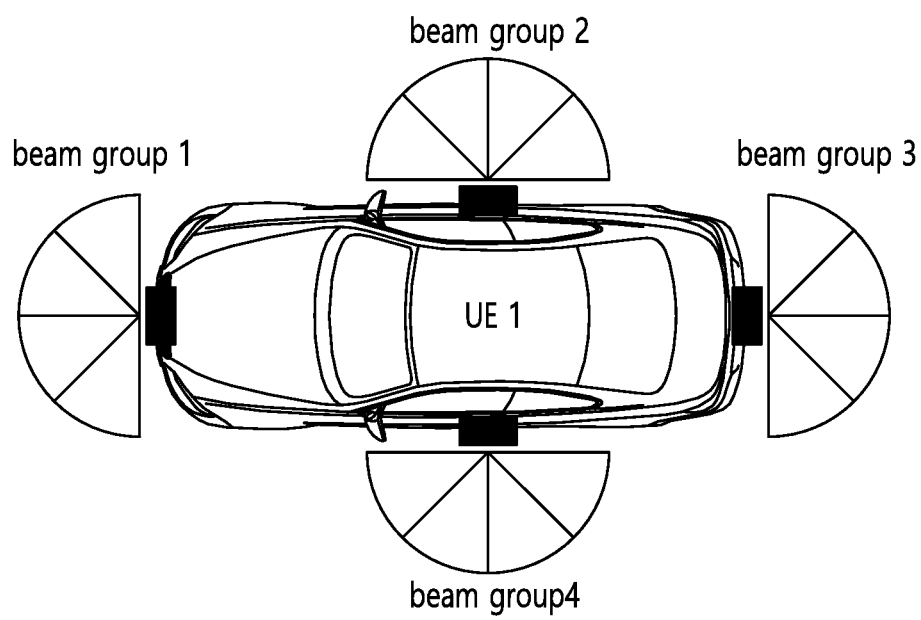
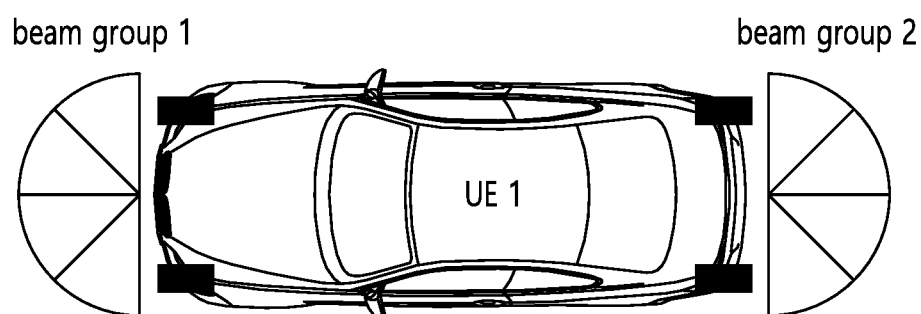
■ : RU

FIG. 13
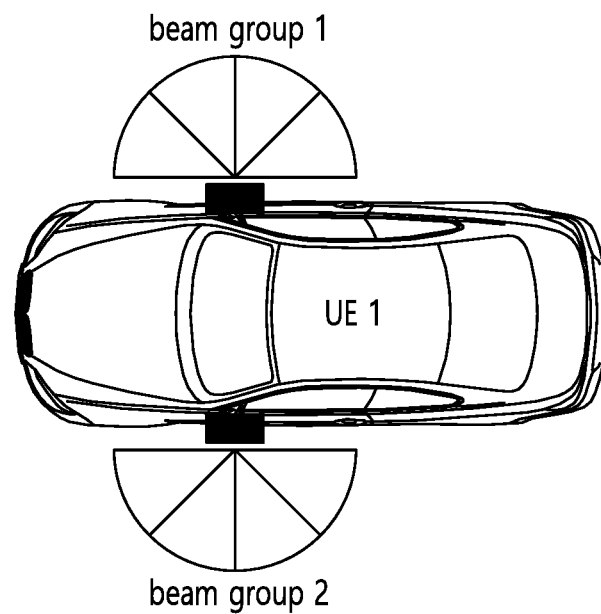
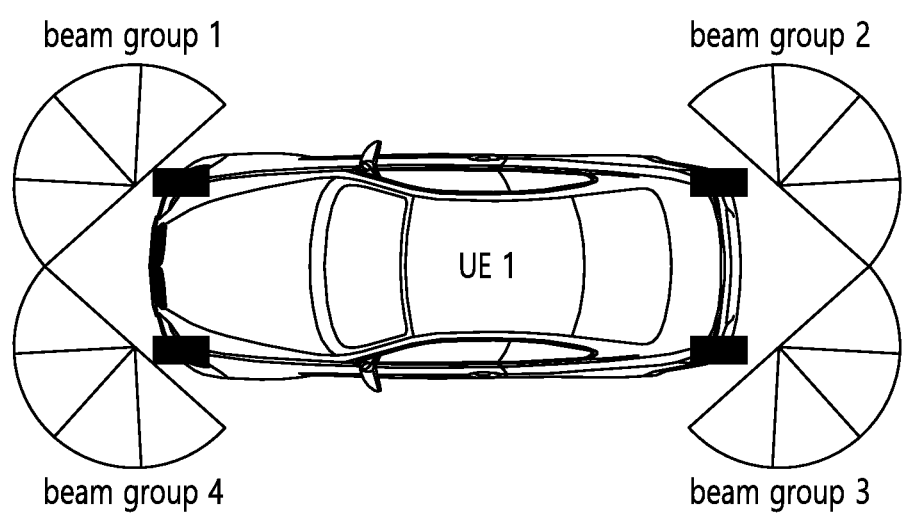
■ : RU

METHOD AND DEVICE FOR TRANSMITTING RELAY SIGNAL FOR V2X COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2017/007689, filed on Jul. 18, 2017, which claims the benefit of U.S. Provisional Applications No. 62/408,033 filed on Oct. 13, 2016, and No. 62/424,542 filed on Nov. 20, 2016, the contents of which are all hereby incorporated by reference herein in their entirety.

BACKGROUND OF THE INVENTION

Field of the Invention

The present specification relates to wireless communication, and more particularly, to a method for transmitting a relay signal for vehicle to everything (V2X) communication in a wireless communication system, and a device using the method.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization. In the meantime, V2V operation scenarios based on not only LTE PC5 interface but also LTE Uu interface or a combination of Uu and PC5 has been considered. The maximum efficiency of V2V services may be achieved by selecting/switching the operation scenario properly.

Early completion of the corresponding radio access network (RAN) specification for PC5-based V2V and integration with Uu interface will enable fast preparation for device and network implementation, thereby allowing more chance for LTE-based V2V in the market. In addition, it can provide the basis for other V2X services, especially vehicle-to-infrastructure/network (V2I/N) and vehicle-to-pedestrian (V2P) services, so that RAN support for all the V2X services can be completed in time.

SUMMARY OF THE INVENTION

The present specification provides a method and apparatus for transmitting a relay signal for vehicle to everything (V2X) communication in a wireless communication system.

The present specification provides a method and apparatus for transmitting a relay signal for V2X communication in a wireless communication system.

The apparatus includes a radio frequency (RF) unit transmitting and receiving a radio signal and a processor operatively coupled to the RF unit.

First, summarizing terminologies, a communication group is a group consisting of at least one user equipment (UE), and may also include a base station (BS) or a road side unit (RSU). In the present embodiment, the communication group may include a first UE, a second UE, a third UE, a BS, or an RSU. In this case, the communication group may correspond to a platoon group for V2X communication. Although a location of a vehicle is determined in the platoon in the order of the second UE, the first UE, and the third UE in the present embodiment, this is for exemplary purposes only, and thus the vehicle may be deployed variously.

The first UE receives allocation information of a first relay resource and second relay resource for the communication group from the BS or a communication group head. In this case, the allocation information of the first relay resource and second relay resource for the communication group may be received through UE-specific signaling or common signaling for the communication group. Since the first relay resource and the second relay resource are common in the communication group, the BS may report the allocation information to each UE in a multicast manner. However, a direction of a transmission beam and reception beam for the first relay resource and a direction of a transmission beam and reception beam for the second relay resource may be received through UE-specific signaling. Since a reception target and a transmission target are different for each UE, the reception target and the transmission target are preferably reported separately to each UE.

When the first relay resource and the second relay resource are allocated, and when the direction of the transmission beam and reception beam for the first relay resource and the direction of the transmission beam and reception beam for the second relay beam are determined, the first UE receives a data signal from the second UE through a reception beam for the first relay resource.

The first UE transfers the data signal to the third UE through the transmission beam for the first relay resource. That is, the first UE relays to the third UE a data signal received from the second UE by using an amplify-and-forward scheme. The amplify-and-forward scheme is a scheme in which a received signal is relayed (transferred) without decoding within an orthogonal frequency division multiplexing (OFDM) cyclic prefix (CP) length through only an analog stage without having to be subjected to a digital stage.

Specifically, the data signal may be amplified before being decoded by the first UE and be then transferred to the third UE. The data signal may be decoded by the first UE after being transferred to the third UE.

The first UE transmits ACK/NACK for the data signal to the second UE through the transmission beam for the second relay resource. The ACK/NACK for the data signal may be transmitted after the data signal is decoded by the first UE. That is, an ACK/NACK transmission resource for the data signal received through the first relay resource is configured as the second relay resource.

In this case, the reception beam for the first relay resource is symmetrical to the transmission beam for the second relay resource. In other words, a beam used as the reception beam for the first relay resource is configured to be the same as a beam used as the transmission beam for the second relay resource. This symmetry is equally applied not only to the first UE but also to the second UE and the third UE.

The first UE may receive the data signal from the third UE through the reception beam for the second relay resource. The first UE may transmit, to the third UE, ACK/NACK for the data signal received from the third UE through the transmission beam for the first relay resource. That is, an ACK/NACK transmission resource for the data signal received through the second relay resource is configured as the first relay resource.

In this case, the transmission beam for the first relay resource is symmetrical to the reception beam for the second relay resource. In other words, a beam used as the transmission beam for the first relay resource is configured to be the same as a beam used as the reception beam for the second relay resource. This symmetry is equally applied not only to the first UE but also to the second UE and the third UE.

In addition, the first UE may periodically receive a reference signal from the BS. The direction of the transmission beam and reception beam for the first relay resource may be updated based on the reference signal.

In addition, the first relay resource and the second relay resource may be periodically allocated by applying frequency hopping. A long cyclic prefix (CP) may be applied to each of the first relay resource and the second relay resource, and a last orthogonal frequency division multiplexing (OFDM) symbol may be null.

In addition, the first UE may receive a control signal including a common process ID (PCID) and common PCID expiration field for the communication group from the BS or a fourth UE in the communication group or a UE-type road side unit (RSU). Since the common PCID is also common in the communication group, the BS may report the control signal to each UE in a multicast manner. The fourth UE in the communication group may correspond to a UE other than the first UE, second UE, and fourth UE in the communication group.

The common PCID expiration field may indicate the number of subframes remaining from a subframe at which the control signal is received until a subframe at which the common PCID expires.

In this case, the data signal may be received from the second UE by using the common PCID. If the common PCID expiration field indicates that the number of remaining subframes is 0, the data signal may not be transferred to the third UE. If the common PCID expiration field indicates that the number of remaining subframes is greater than 0, the data signal may be transferred to the third UE by using the common PCID. That is, whether to relay the data signal may be determined according to whether the PCID expires.

In addition, the common PCID may include a first PCID bit indicating identification information of a UE which initially transmits the data signal and a second PCID bit indicating a transport block of the data signal. That is, the first UE which has received the data signal may use the common PCID to confirm which UE in the communication group has transmitted the signal by using a first PCID bit and confirm how many transport blocks have been transmitted so far by using a second PCID.

In addition, the first UE may de-mask a cyclic redundancy check (CRC) of the control signal by using a temporary identifier for identifying the common PCID for the communication group. This is because the temporary identifier separately designated by the BS is transmitted by being masked with the CRC of the control signal. The temporary identifier may be set to be different for each communication group.

The use of the proposed technique has an advantage in that terminals in a platoon can exchange a platoon's common signal while minimizing a delay. In addition, signal reliability can be improved by increasing the number of times of performing retransmission to minimize the delay.

In addition, by using the proposed technique, reliability of signal transmission in a communication group can be increased since a terminal in a communication group, a base station, and a road side unit (RSU) can relay a signal even if the signal is transmitted by any terminal in the communication group. In addition, a collision problem of a retransmission process ID (PCID) can be solved, which may occur when transmitted by any terminal in the communication group.

BRIEF DESCRIPTION OF THE DRAWINGS

FIG. 12 shows an example of constituting a beam group for V2X communication.

FIG. 13 shows another example of constituting a beam group for V2X communication.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the 3GPP LTE/LTE-A. However, technical features of the present invention are not limited thereto.

Figure 1:
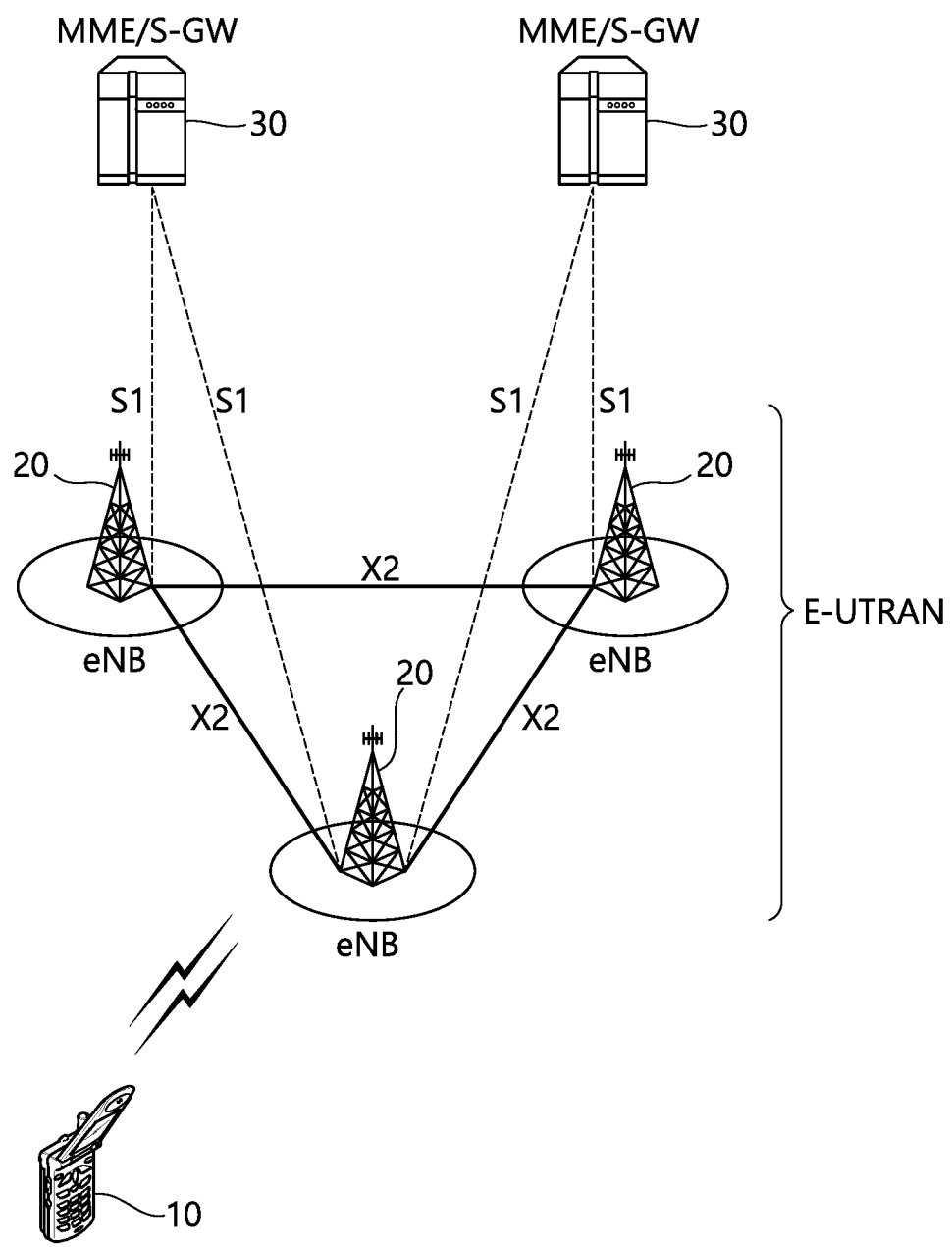
FIG. 1 illustrates a wireless communication system to which the present specification is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
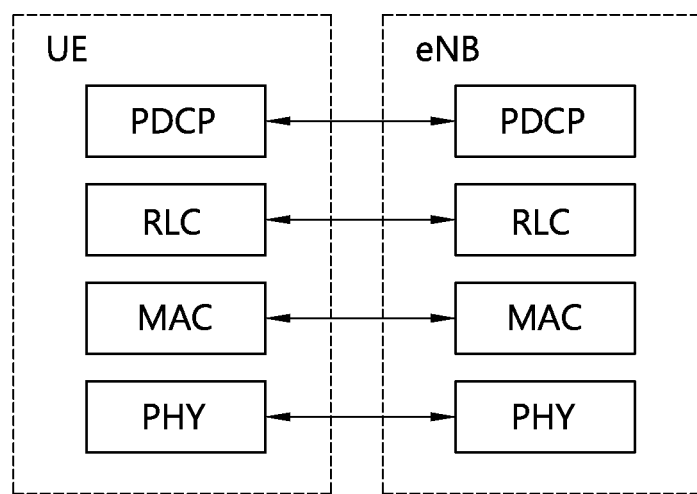
FIG. 2 is a block diagram illustrating a radio protocol architecture for a user plane.
Figure 3:
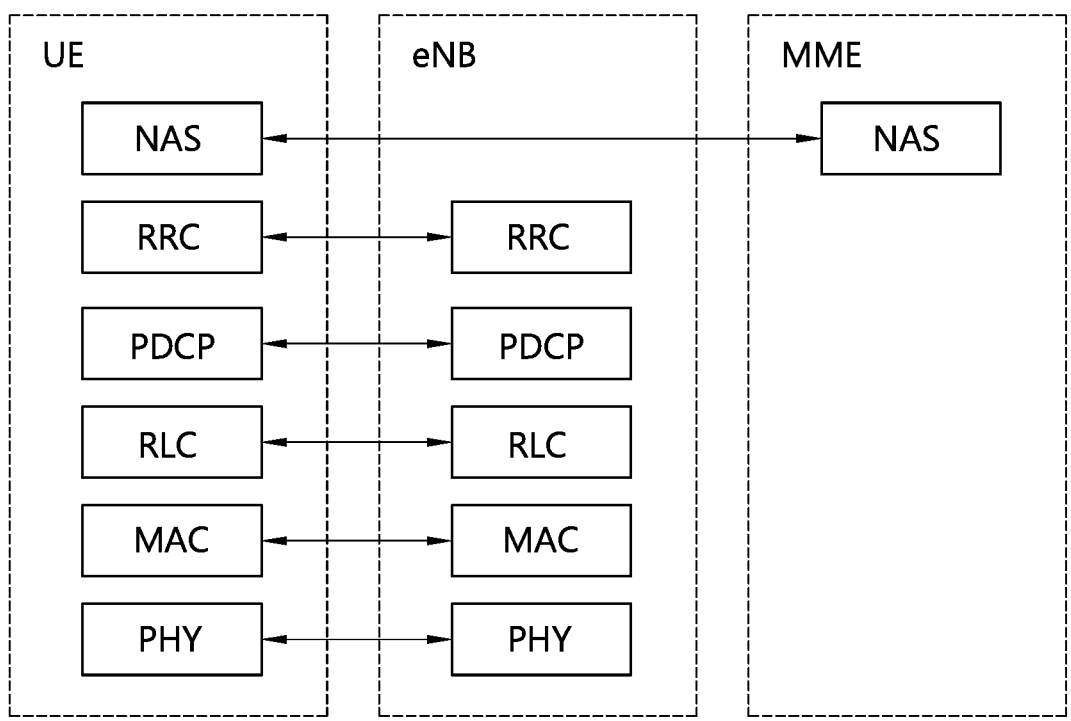
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, a sidelink is described. The sidelink is an interface between UEs for sidelink communication and sidelink direct discovery. The sidelink corresponds to a PC5 interface. The side link communication is AS functionality enabling proximity-based services (ProSe) direct communication between two or more nearby UEs by using an E-UTRAN technique but not traversing any network node. The sidelink discovery is AS functionality enabling ProSe direct discovery between two or more nearby UEs by using the E-UTRA technique but not traversing any network node. The sidelink uses a UL resource and physical channel structure similarly to UL transmission. Sidelink transmission uses the same basic transmission scheme as the UL transmission scheme. However, the sidelink is limited to single cluster transmission for all sidelink physical channels. In addition, the sidelink uses a gap of one symbol at an end of each sidelink subframe.

Figure 4:
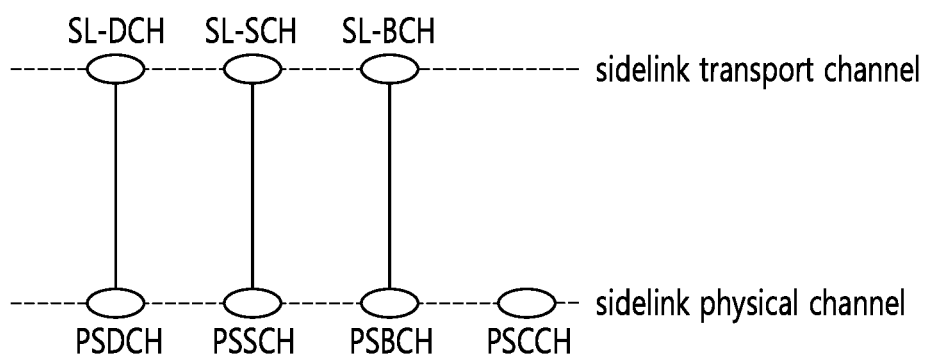
FIG. 4 shows mapping between sidelink transport channels and sidelink physical channels.

FIG. 4 shows mapping between sidelink transport channels and sidelink physical channels. Referring to FIG. 4, a physical sidelink discovery channel (PSDCH) carrying sidelink discovery message from the UE is mapped to a sidelink discovery channel (SL-DCH). A physical sidelink shared channel (PSSCH) carrying data from a UE for sidelink communication is mapped to a sidelink shared channel (SL-SCH). A physical sidelink broadcast channel (PSBCH) carrying system and synchronization related information, transmitted from the UE, is mapped to a sidelink broadcast channel (SL-BCH). A physical sidelink control channel (PSCCH) carries control from a UE for sidelink communication.

Figure 5:
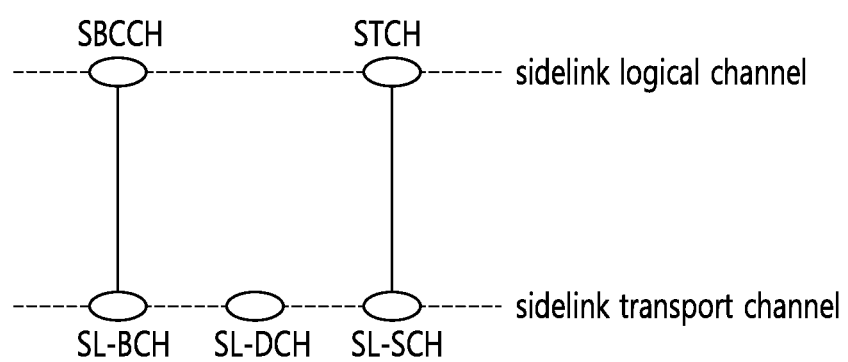
FIG. 5 shows mapping between sidelink logical channels and Sidelink transport channels.

FIG. 5 shows mapping between sidelink logical channels and Sidelink transport channels. Referring to FIG. 5, SL-BCH is mapped to a sidelink broadcast control channel (SBCCH). The SBCCH is a sidelink channel for broadcasting sidelink system information from one UE to other UE(s). This channel is used only by sidelink communication capable UEs. SL-SCH is mapped to a sidelink traffic channel (STCH). The STCH is a point-to-multipoint channel, for transfer of user information from one UE to other UEs. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block type-18 (SIB18) provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
Uu transmission/reception (highest priority);
PC5 sidelink communication transmission/reception;
PC5 sidelink discovery announcement/monitoring (lowest priority).

The UE supporting sidelink communication can operate in two modes for resource allocation. The first mode is a scheduled resource allocation. The scheduled resource allocation may be referred to as Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection. The UE autonomous resource selection may be referred to as Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used, and the resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of EUTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection which is a resource allocation procedure where resources for announcing of discovery message are allocated on a non UE specific basis. The UE autonomous resource selection may be referred to as Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to as Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for UE autonomous resource selection based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Hereinafter, space division duplex (SDD) for V2X communication is described.

The SDD considered in the present specification is a technique in which each antenna of a UE is subjected to space division to independently operate a communication link of each antenna. In order to independently operate the communication link for each antenna, self-interference between antennas of the UE shall be cancelled, and interference between UEs included in the communication link shall be reduced.

As a technique for cancelling the self-interference between the antennas of the UE, there is a technique of applying analog and digital self-interference cancellation techniques or a technique of reducing the self-interference by securing a distance between the antennas. The latter has a lower complexity than the former and thus is easier to apply to real systems. The latter technique can be applied to a vehicle UE having a larger size than an existing communication UE by securing the distance between the antennas. The inter-cell interference reducing technique of the existing cellular communication system can be applied as a technique for reducing interference between UEs. At present, in cellular communication with a high frequency of at least 6 GHz, since a beam width is small in order to secure a communication distance, it is considered that there is a low probability that beams of adjacent cells overlap to cause interference. In addition, there is a high probability that a signal will is blocked by an object due to linearity of the signal. Since a surface of a vehicle is made of iron and a size thereof is large, there is a high probability that a high-frequency signal of an adjacent UE will be blocked.

Figure 6:
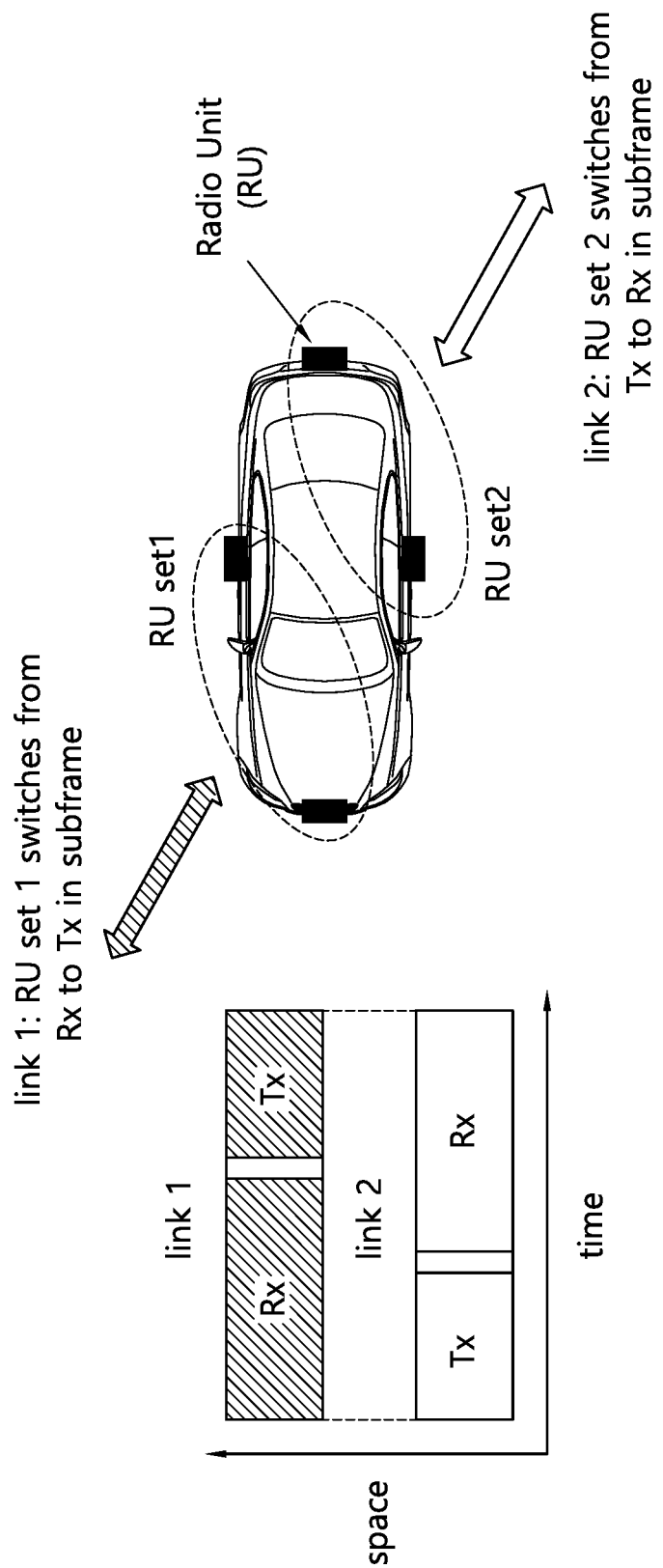
FIG. 6 shows an example of applying space division duplex (SDD) in a vehicle to which distributed antennas are applied.

Due to the above characteristics, space division communication is easy to apply in inter-vehicle high frequency communication with distributed antennas. When the space division communication is applied, since links of the antennas are isolated from each other, it is possible to allocate different transmission/reception points of the respective communication links and reuse frequency resources in each communication link. FIG. 6 is an example of applying space division communication.

FIG. 6 shows an example of applying SDD in a vehicle to which distributed antennas are applied.

In FIG. 6, a link 1 and a link 2 are communication links connected with different devices (UE or BS). According to a situation of each communication link, a transmission (Tx) resource and a reception (Rx) resource may change in amount, and a Tx time point and an Rx time point may change. In the figure above, a radio unit (RU) is an antenna module which aggregates a plurality of antennas. In this case, the UE has 4 RUs in a distributed manner. 2 RUs out of the 4 RUs are used to construct the link 1, and the remaining 2 RUs are used to construct the link 2.

Figure 7:
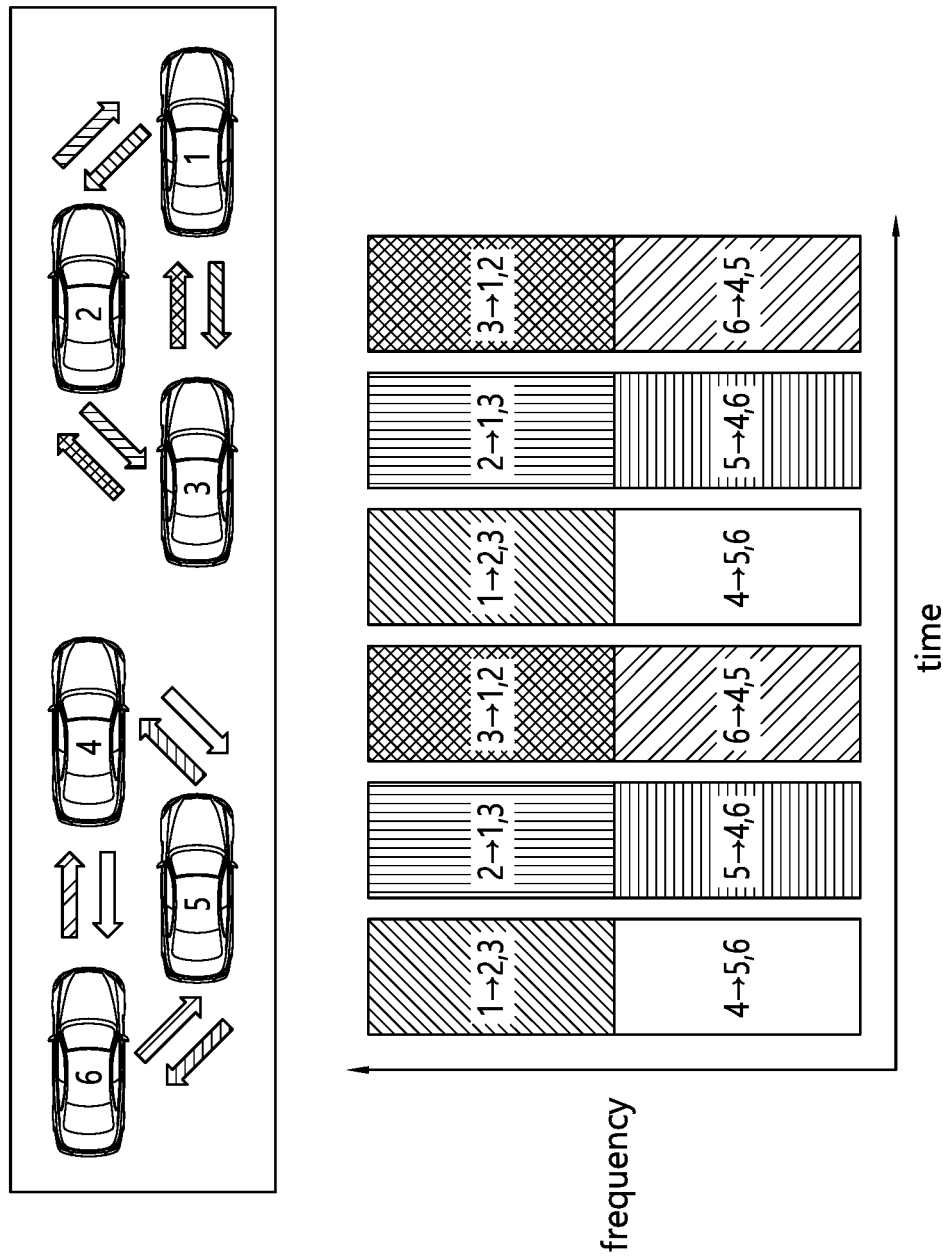
FIG. 7 shows an example of inter-vehicle communication to which SDD is not applied.
Figure 8:
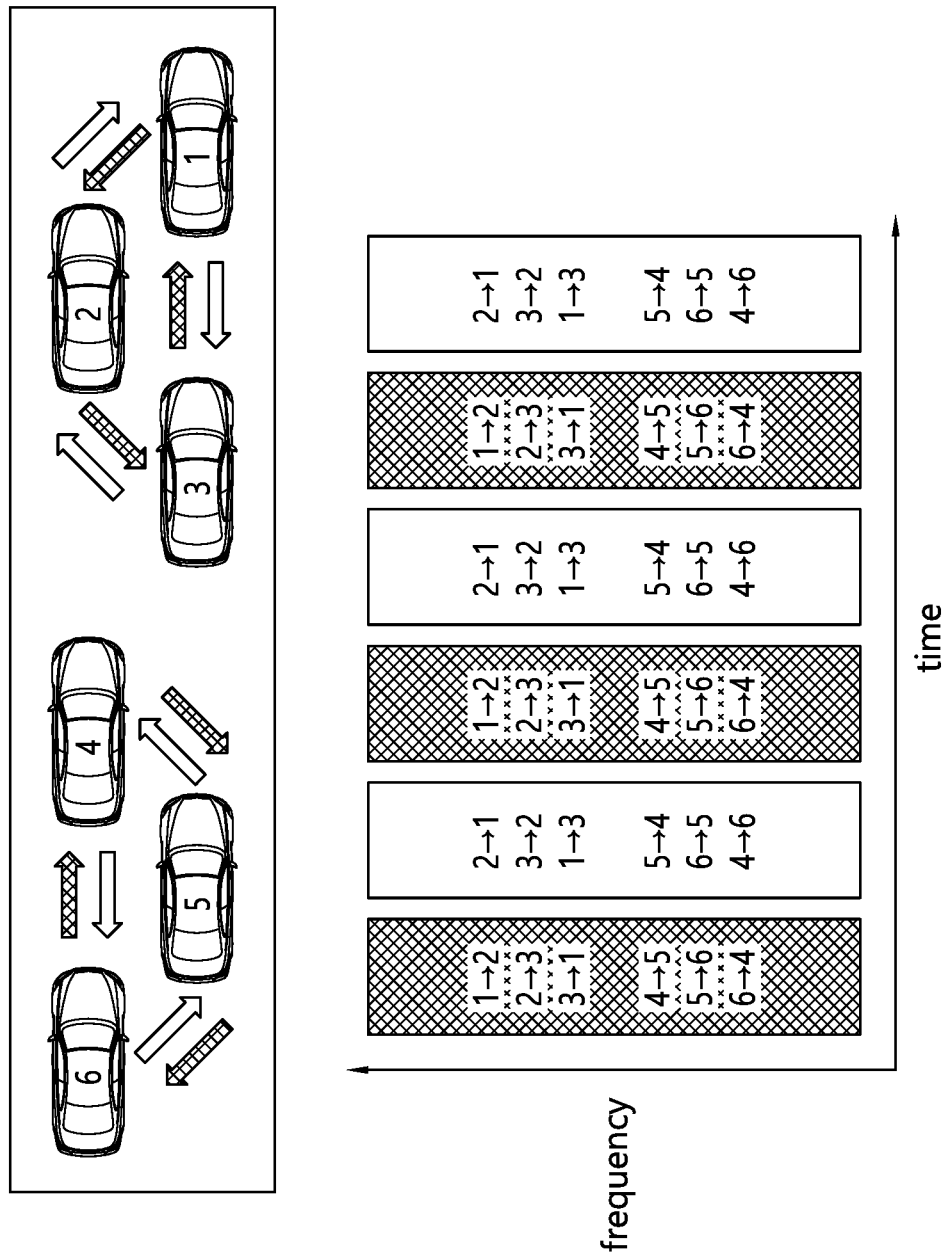
FIG. 8 shows an example of inter-vehicle communication to which SDD is applied.

When the SDD is applied to a plurality of UEs, there is an advantage in that transmission can be performed many times since more resources are used within a target time than the opposite case. FIG. 7 and FIG. 8 are examples of comparing a case of applying SDD and a case of not applying SDD.

FIG. 7 shows an example of inter-vehicle communication to which SDD is not applied. FIG. 8 shows an example of inter-vehicle communication to which SDD is applied.

When the SDD is not applied as shown in FIG. 7, a UE transmits signals simultaneously to different UEs in a multiplexed manner. If three UEs intend to establish a communication link with each adjacent UE as shown in FIG. 7, one transmission resource and two reception resources shall be allocated to each UE.

If the SDD is applied as shown in FIG. 8, since the UE needs to constitute one transmission resource and one reception resource for each communication link, the number of times of performing signal transmission may be greater in a unit time. In case of applying the SDD, a frequency resource allocated to the UE shall be shared with adjacent UEs which simultaneously transmit signals. If the SDD is applied, since a transmission signal of each UE is spatially divided, the same frequency resource can be used, thereby increasing the frequency resource used by each communication link.

In addition to the aforementioned advantage, since a receiving UE of each communication link receives a signal by using a narrow reception beam, a probability of being affected by jamming is decreased. In addition, since there is a high probability that an adjacent vehicle blocks a signal, jamming from a far distance is difficult. There is another advantage in that resource management complexity of a BS is decreased since the BS does not have to perform management so that inter-communication group resource and intra-communication group resource are resources orthogonal to each other. In TR 22.886, a scenario is included in which 15840 vehicles are present per one mile. In this case, complexity of the BS is too increased for the BS to manage each communication link between vehicles. When the SDD is applied, since only a transmission time point and a reception time point are to be determined between UEs included in the communication link, there is an advantage in that the complexity of the BS is decreased.

Hereinafter, a V2X use case for an automated vehicle is described.

<Scenario 1: Overtaking Maneuver Scenario>

Figure 9:
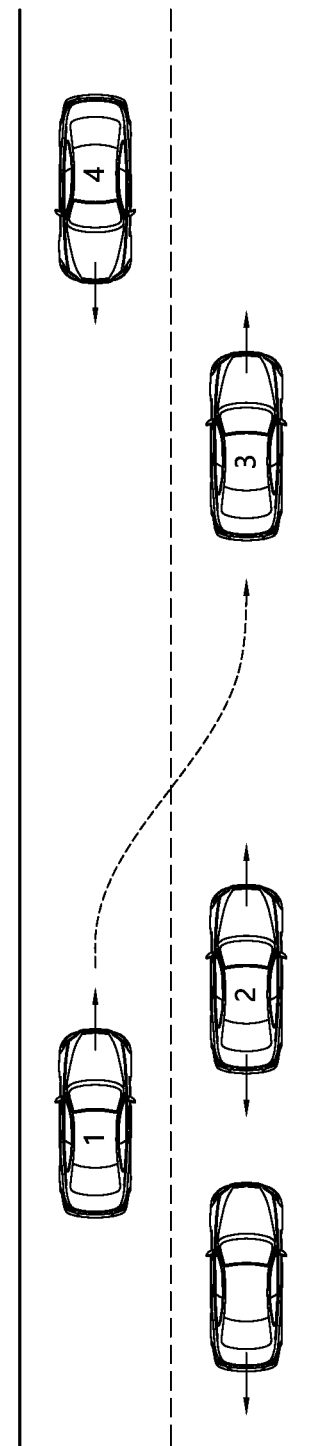
FIG. 9 shows an automated overtaking maneuver scenario in vehicle to everything (V2X) communication for an automated vehicle.

FIG. 9 shows an automated overtaking maneuver scenario in V2X communication for an automated vehicle.

Referring to FIG. 9, an automated vehicle 1 attempts to overtake another vehicle 2. During this attempt, an unpredictable change or deviation from the predicted trajectory may happen. It may come from the change of nearby vehicle's behavior or the appearance of animal and other objects on the road.

An overtaking maneuver has been planned with certain granularity and agreed upon by neighboring vehicles. The accuracy of the overtaking maneuver depends on the granularity (i.e. the size of discrete grid elements) of trajectories. If an unexpected road situation happens, a new joint solution needs to be negotiated quickly to avoid collisions. This needs to be completed before the vehicles enter the next grid element of the trajectory.

A road with a lane of width 3.5 m and a trajectory accuracy of 0.3 m is assumed in the present scenario. It is also assumed that vehicles on the road move with the speed of 30 m/s (108 km/h). In this case, each vehicle is passing a grid element every 10 ms.

If an unexpected road situation happens, a new plan has to be established in order to avoid an accident. A consolidated agreement on road trajectories requires at least three types of messages: a set of offered trajectories from each involved vehicle, an evaluation of all options, and an acknowledgment message. Each communication step needs to be completed within 3.3 ms, neglecting the computational requirements of each step.

<Scenario 2: Cooperative Perception Scenario>

Autonomous driving systems are based on the environmental information obtained via its own sensors. In reality, however, a vehicle cannot obtain the complete scene of the road and surrounding environment because of large trucks or busses blocking its view. Besides this, autonomous vehicles are expected not only to exchange the local awareness information between each other but also to be able to detect numerous features of surrounding environment by means of various sensors and cameras.

Cooperative active safety systems can warn drivers of dangerous situations and intervene through automatic braking or steering if the driver is unable to avoid an accident. Cooperative driving applications, such as platooning (road-trains) and highly automated driving can reduce travel time, fuel consumption, and CO2 emissions and also increase road safety and traffic efficiency. Moreover, not only cooperation between vehicles or between vehicles and infrastructure is required, but also the cooperation between vehicles and vulnerable road users, e.g. pedestrians and cyclists, through their mobile devices, such as smartphone and tablets, will be an important key element to improve traffic safety. C-ITS systems rely on timely and reliable exchange of information. Common to most applications are real-time requirements, and strict requirements on reliability and availability, especially when considering high mobility and large message sizes.

In addition, in the traffic scenario, the front vehicle could provide the real-time video data to the rear vehicle on as-needed basis in complex driving situation such as an automatic overtaking maneuver. Usual values for commercial video encoders are in the range of 100 ms. Thus, the video is assumed to be transmitted in raw format to avoid encoding and decoding delays and be used in real time for driving purpose. The camera capabilities shall be sufficient for feature extraction suitable for future autonomous driving task. Assuming gray-scale video with a resolution 1280×720 pixels and a refresh state of 30 fps, a data rate of 220 Mbps is required.

In addition, end-to-end latency requirements of less than 5 ms for message sizes of about 1600 bytes need to be guaranteed for all V2X transmissions. Data is sent either event-driven or periodically with a rate of about 10 Hz. Relative speeds of up to 500 km/h are possible on high-speed highways. Periodic broadcast traffic consist of at least 1600 bytes with repetition rate of 1-50 Hz for transmission of information related to objects resulting from local environmental perception and the information related to the actual vehicle.

<Scenario 3: Platooning Scenario with/without Leading Vehicle>

Use case 3-1 (platoon with leading vehicle): Vehicles properly arranged in platoons with enabled automated control of their speed and steering allow to reduce fuel consumption, increase safety, improve road congestion and increase driver convenience. For obtaining true benefit from platooning, each vehicle in platoon must be equipped with certain communication technology to exchange real-time information about a change of platoon's common parameters, such as acceleration, breaking, change of trajectory, etc. Also, the vehicles have to follow each other as near as possible for the improvement of road congestion and optimal fuel consumption, but on the other hand, close spacing leads to higher risk of collision and requires very strict latency and reliability constraints.

Use case 3-2 (platoon without leading vehicle): In a multi-lane convoy use case, a leading vehicle, centralized controller, or supervisor does not exist. Instead, the vehicle control, in both lateral and longitudinal directions, is distributed over all members of the convoy (see FIG. 9). The result of this approach is that vehicle disturbances, such as a braking vehicle, affect all members of the convoy to a greater or lesser extent, resulting in a stable formation.

Figure 10:
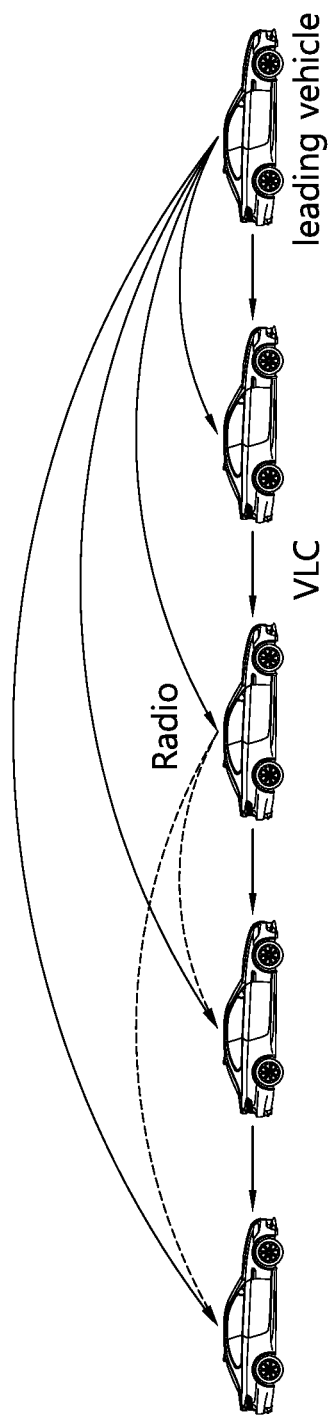
FIG. 10 shows a platoon scenario in V2X communication for an automated vehicle.

FIG. 10 shows a platoon scenario in V2X communication for an automated vehicle.

Scenario 3-1 (braking): It is assumed that each vehicle participated in a platoon has an advanced brake control to compensate for variances in vehicle load, road properties, and the brake system. The brake controller is imperfect so that the imperfection is modelled by additive Gaussian noise of a given variance. The probability of accident is approximately $10^{-6}$ when the variance of the brake controller is $10^{-4}$, vehicles in a platoon moves at speed of 23 m/s, the distance between vehicles is 4.5 m and the packet is successfully delivered at the first transmission. Thus, it can be seen that very low packet error rate (e.g. less than $10^{-6}$) is desirable.

Scenario 3-2 (platoon's common parameter+ video data for cooperative perception): The leading vehicle in a platoon transmits platoon's common parameter to the following vehicles via a carrier 1. Also, its video data is delivered with/without platoon's common parameters to the rear vehicles in a multi hop fashion via a carrier 2. Usually, the carrier 2 has much higher frequency than the carrier 1. For example, DSRC and LTE V2V can be used as the carrier 1 and mmWave and visible light communication (VLC) can be used as the carrier 2. The carrier 1 has less propagation loss than the carrier 2 so that the carrier 1 can deliver platoon's common parameter to the last vehicle in the platoon within a short latency. However, the carrier 1 is vulnerable to radio jamming attacks and the areal spectral efficiency and data rate of the carrier 1 are lower than those of the carrier 2.

Scenario 3-3 (platoon without leading vehicle: convoy): In order to maintain small inter-vehicle distances, convoy members rely on the high-frequency exchange of up-to-date and high-quality vehicle dynamics data among vehicles in the convoy. The convoy control algorithm requires just the vehicle dynamics information of neighbor vehicles, instead of the information of all convoy members. As such, the algorithm scales well to large convoys and converges easily to a desired formation when vehicles join and leave the convoy.

Scenario 3-4: In addition to the scenario 2, I2V link or V2I2V link can be used to deliver verified information to vehicles in a platoon. Infrastructures collect information from its sensors and vehicles and forward it to a server. The server filters trumped-up and fabricated information. For example, the server could drop the information collected from vehicles in the black list. The server sends the filtered information to infrastructures and infrastructures forward the filtered information to vehicles in a platoon.

However, there is a possibility of signal blocking according to the aforementioned scenario. Reliability and low-latency of inter-vehicle communication are very important in a service such as a platoon or convoy described in the scenario 3. However, it is expected that a distance between vehicles is at least 4.5 m, and in general, a vehicle interval is set to about 6 to 8 m due to instability of a brake control device, a communication latency, or the like. When the vehicle interval is increased, any vehicle not belonging to the platoon may cut in between platoon groups to overtake. In this case, reliability of communication between platoon groups may deteriorate due to the cut-in vehicle. Summarizing terminologies, the platoon corresponds to a group of vehicles which are driven in a single lane, and autonomous driving is not necessary. The convoy corresponds to a group of vehicles which are driven in several lanes, and is used when the vehicle is automatically driven.

In addition, V2X communication is limited in an LTE system. Since a vehicle may cut in at any section of a platoon in the above scenario, a UE which blocks a signal may be any UE in a communication group. Therefore, in order to solve the aforementioned problem, any UE in a group shall be capable of relaying a signal transmitted by any UE. In the ongoing 3GPP V2X study item, studies are being conducted mainly on periodic signal broadcasting between vehicles, and a problem for the scenario cannot be solved by simply applying a corresponding result.

In addition, communication with low-latency and high-reliability is being proposed as a requirement for 5G V2X. For example, according to 3GPP TR22.886, in case of collective perception, it is necessary to transmit data to a vehicle in the range of 200 m with reliability of 99.999% within 3 ms, and in case of emergence trajectory, it is required to transmit data to a vehicle in the range of 500 m with reliability of 99.999% within 3 ms.

When the information is transmitted to the vehicle in the range of 500 m, there is a probability that the vehicle blocks a signal. Therefore, it is possible to consider a method of transferring a signal far away using multi-hop communication between vehicles. However, in multi-hop communication, a delay increases with the increase in the number of hops. This makes it difficult to transfer a signal within 3 ms. Therefore, a technique is needed to minimize the increase in the delay even if the number of hops increases.

Accordingly, a method of transmitting a relay signal for V2X communication capable of solving the above problem and necessity will be described hereinafter.

Figure 11:
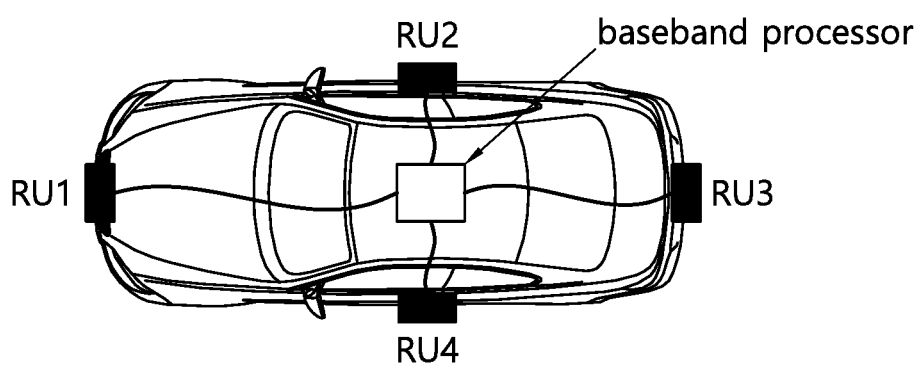
FIG. 11 shows an example of deploying a baseband processor and a radio unit (RU) in a vehicle which performs V2X communication.

FIG. 11 shows an example of deploying a baseband processor and an RU in a vehicle which performs V2X communication.

In the present specification, a radio unit (RU) may consist of one or multiple physical antennas, and one RU may have one or multiple antenna ports. The RU may simply have only a function of an RF module. When the RU simply has only the function of the RF module, the RU is the same as an antenna. In addition thereto, if the RU has only one antenna port, a single RU is the same as a single antenna port. The RU may include not only the function of the RF module but also the part or entirety of an L1 function or up to the part of an L2/L3 function.

In the present specification, the UE also includes a vehicle having a communication module installed therein, in addition to the existing mobile phone and smart phone. Referring to FIG. 11, the UE may have multiple RUs (RU 1, RU 2, RU 3, RU 4, . . . ). In addition, it can be seen that the multiple RUs are connected to a baseband processor.

In the present specification, a subframe is a time unit of a physical layer, and may be replaced with a time duration, a transmission time duration, a slot, a transmission unit (TU), or the like. In addition, a road side unit (RSU) described in the present specification may be a UE-type RSU or a BS-type RSU.

For example, when n vehicles constitute one platoon group, one communication group may be constituted by aggregating the n vehicles and an adjacent BS (herein, n is a natural number). For another example, all vehicles in a cell and a BS of the cell may constitute one communication group. In addition, one UE may belong to different communication groups at the same time.

Space division duplex communication described in the present specification implies not only communication in which an RU 1 and RU 2 of a UE 1 simultaneously transmit/receive signals but also communication in which the RU 2 can receive a signal while the RU 1 performs transmission or the RU 1 can receive a signal while the RU 2 transmits a signal. For this, the RU 1 and the RU 2 may be considered as a separate transmission and reception unit (TXRXU).

Although an entity for scheduling communication between UEs is described as a BS in the present specification, the BS may be replaced with an RSU or a UE-type RSU or a cluster head UE which is in charge of communication between the UEs.

A case where a UE is capable of configuring a beam group is assumed in the present specification. In the present specification, the beam group implies a unit by which the UE can independently perform transmission or reception. That is, a different beam group has a separate TXRXU. If self-interference between TXRXUs included in different beam groups is less than or equal to a specific value or can be decreased to be less than or equal to the specific value by using a self-interference canceller, the UE can transmit a signal in a beam group 2 while receiving a signal in a beam group 1. In addition, the beam group may be configured such that a Tx beam group and an Rx beam group are the same as or different from each other.

The beam group may correspond to the TXRXU in a one-to-one or one-to-many manner. That is, when the UE has N TXRXUs, the UE may construct N or less beam groups. In addition, the beam group may consist of one or more analog beams. For example, if the UE has N TXRXUs and analog beamforming is not applied to each TXRXU, the UE may have N beam groups and each beam group may consist of one beam. In this case, the beam group is the same as the TXRXU. For another example, if the UE has N TXRXUs and analog beamforming is applied to each TXRXU, the UE may have N beam groups and each beam group may consist of multiple beams.

FIG. 12 and FIG. 13 are examples of constructing a beam group when each RU has a separate TXRXU. In FIG. 12 and FIG. 13, a fan-shaped portion indicates a single beam, and implies a case where one beam group consists of four beams.

FIG. 12 shows an example of constituting a beam group for V2X communication.

In an upper end of FIG. 12, a UE 1 has four beam groups, and four TXRXUs are located in front, rear, and both sides of a vehicle. In a lower end, the UE 1 has two beam groups, and four TXRXUs are located only in front and rear of the vehicle.

FIG. 13 shows another example of constituting a beam group for V2X communication.

In an upper end of FIG. 13, a UE 1 has two beam groups, and two TXRXUs are located only in both sides of a vehicle. In a lower end of FIG. 13, the UE 1 has four beam groups, and four TXRXUs are located at corner portions in front and rear of the vehicle.

Hereinafter, the present specification proposes a scheme in which a UE having a spatially divided beam relays a signal. More specifically, the present specification proposes a scheme in which a UE relays a signal to a UE included in the same communication group by using an amplify-and-forward scheme. The present specification aims to exchange a signal quickly by several UEs belonging to a platoon.

The amplify-and-forward scheme is a scheme in which a received signal is not decoded but is relayed (transferred) within an OFDM CP length only through an analog stage without having to be subjected to a digital stage. A signal may be amplified since the signal is subjected to the analog stage.

For example, a BS or a UE which is a cluster head in a communication group semi-statically allocates a signal relay resource in the communication group. A plurality of signal relay resources may be configured in the communication group. The BS semi-statically designates a transmission target and reception target for each signal relay resource to each UE in the communication group. For example, in a signal relay resource 1, a reception target of a UE 1 may be a UE 0, and a transmission target may be a UE 2. In this case, the UE 1 relays to the UE 2 a signal of the UE 0 received on the relay resource 1. In addition, in a signal relay resource 2, a reception target of the UE 1 may be the UE 2, and a transmission target may be the UE 0. In this case, the UE 1 relays to the UE 0 a signal of the UE 2 received on the relay resource 2.

Figure 15:
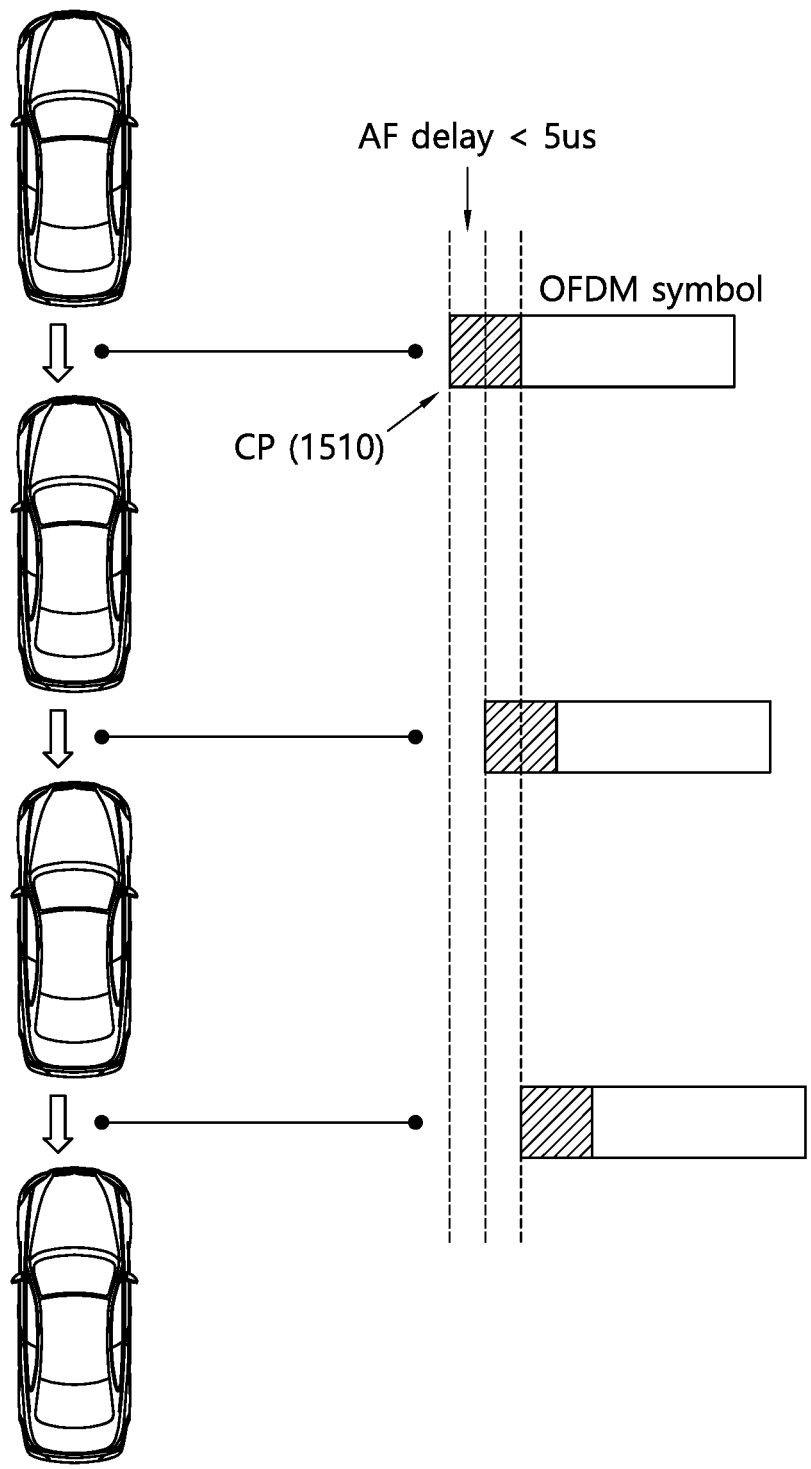
FIG. 15 shows an example of a delay depending on signal relaying for V2X communication.

In the present specification, a reason of periodically allocating a signal relay resource in the communication group is as follows. In a platoon group, there is a need to periodically exchange a signal related to vehicle control. If the platoon group is identical to the communication group, a signal is periodically exchanged in the communication group. Thus, a resource is preferably allocated semi-statically to decrease an overhead of a physical layer control signal in order to periodically exchange the signal. In addition, in case of applying the amplify-and-forward scheme, a scheme in which a UE relays a signal before decoding a physical layer control signal may be introduced in order to decrease a delay of signal relaying. This is because, in order for the UE to relay a corresponding signal before decoding the physical layer control signal, a relay signal resource needs to be configured in advance, and a signal received on a corresponding resource is configured to be relayed unconditionally. When a corresponding scheme is applied, it is possible to transmit a signal in the communication group within several microseconds (us) also in multi-hop communication as shown in FIG. 15 described below.

There are two approaches for transferring allocation information of a relay resource by a BS to a UE. In a first approach, the BS reports the information to each UE in a communication group through UE-specific signaling. In a second approach, the BS may indicate signal relay resources through common signaling in the communication group, and may report a transmission target and reception target for a relay resource of each UE through UE-specific signaling.

Since the reception target and the transmission target are different for each UE, the reception target and the transmission target are preferably reported separately to each UE. Therefore, a method of reporting a relay signal resource together while designating a transmission target and a reception target to each UE may be considered. If it is intended to more decrease a signaling overhead, since a relay resource is common in the communication group, a method of reporting a common signal in the communication group in a multicasting manner may be applied.

In addition, the signal relay resource in the communication group may be periodically allocated. In addition, a frequency resource allocated every period may be hopped.

Since there may be interference with an adjacent communication group, a resource is preferably hopped every period. In addition, hopping is preferably performed to decrease signal quality deterioration in the relay resource.

Figure 14:
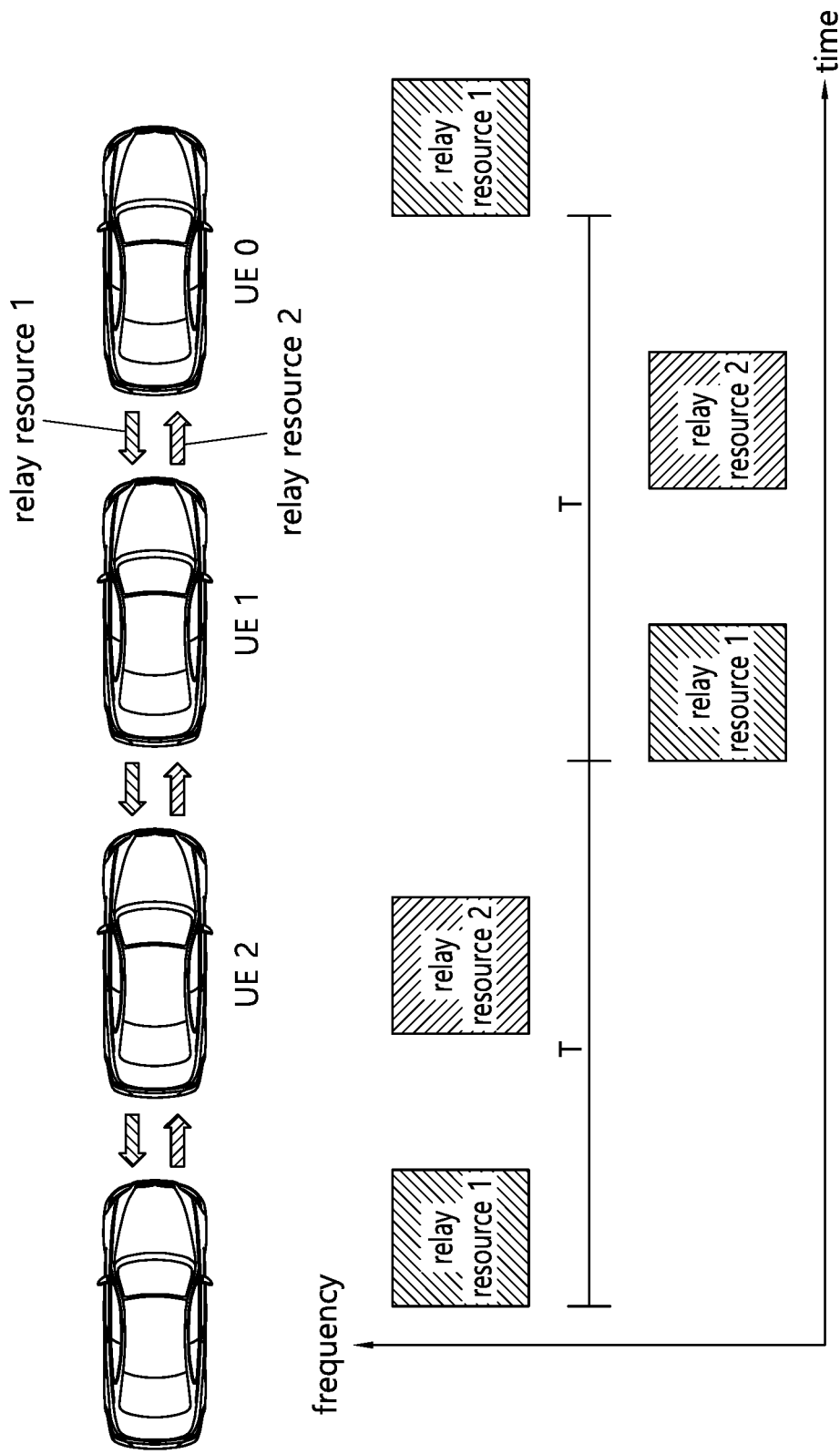
FIG. 14 shows an example of allocating a relay resource for V2X communication.

FIG. 14 shows an example of allocating a relay resource for V2X communication.

Relay resources 1 and 2 are allocated in the embodiment of FIG. 14. In FIG. 14, the relay resources 1 and 2 are periodically allocated, and frequency hopping is applied. In addition, the relay resources 1 and 2 are allocated at different time so that the UE can operate even if the relay resources 1 and 2 have different transfer directions.

FIG. 15 shows an example of a delay depending on signal relaying for V2X communication.

Referring to FIG. 15, a long CP 1510 is applied in a relay resource. In addition, a last OFDM symbol of the relay resource may remain empty without having to transmit a signal.

In general, a delay of about 1~5 us occurs in LTE relays to which amplify-and-forward is applied. When the amplify-and-forward scheme is applied in a multi-hop manner, a delay of 1~5 us occurs in each hop, and thus a delay of about 10 us may occur between first and last signals. By considering this, an OFDM symbol to which the long CP 1510 is applied may be used in the relay resource. In addition, a last symbol of a relay resource may remain empty without having to transmit a signal by considering that the delay is accumulated.

For another example, a UE 1 for which a UE 0 is designated as a reception target and a UE 2 is designated as a transmission target on a signal relay resource 1 operates as follows. The UE 1 selects a reception beam group for receiving a signal of the UE 0 and selects a transmission beam group for relaying a signal to the UE 2. Upon arrival of a signal from a reception beam group configured in the signal relay resource 1, the UE 1 transfers a signal to the UE 2 through a transmission beam by using an amplify-and-forward scheme. The UE 1 decodes the reception signal after or while relaying a signal.

In the above embodiment, a reception beam group and transmission beam group used in the relay resource are different beam groups. This is because a signal can be transmitted while being received only when the beam groups are different from each other. According to the definition of the present invention, this may imply that TXRXUs are different, and further imply that interference between the TXRXUs is less than or equal to a threshold.

Since the UE 1 transmits a signal simultaneously while receiving the signal, decoding starts after relaying the signal. Therefore, it may be considered by default that a signal of the relay resource 1 is unconditionally subjected to the amplify-and-forward.

In addition, upon arrival of a subframe to which the relay resource 1 is allocated, a UE allows a reception analog beam direction to be a direction of a beam included in a pre-set reception beam group, and allows a transmission analog beam direction to be a direction of a beam included in a pre-set transmission beam group. The transmission beam and the reception beam are included in different beam groups (or TXRXUs).

The UE needs to adjust a beam direction to a beam group in advance in a subframe to which the relay resource is allocated. If the beam group includes only one beam, the UE has to adjust an analog beam in a corresponding beam direction. If N beams are included in the beam group, the UE may form an analog beam only in one beam direction among the N beams or may form an analog beam at once in N beam directions. This may be randomly selected by the UE.

In addition, the UE may periodically update a transmission beam group and reception beam group of the signal relay resource 1. For this, the UE may request the BS to periodically transmit a reference signal for beam configuration. Alternatively, the BS may instruct the UE to periodically transmit the reference signal.

Although the reception target and transmission target of the UE 1 are designated semi-statically, an optimal beam direction may change persistently for a reason of a road situation, a car location, or the like. Therefore, the UE needs to periodically update a beam direction suitable for the transmission target and reception target.

In addition, the UE relays a signal only when a signal received on the relay resource has a magnitude greater than or equal to a threshold. The BS designates the threshold to the UE. When a signal of the relay resource is relayed unconditionally, it may be considered to apply the aforementioned scheme since power consumption of the UE may be significant.

In addition, a transmission target and reception target of the signal relay resource 1 allocated to the UE 1 are symmetrical to a transmission target and reception target of the relay resource 2. In this case, the UE 1 transmits ACK/NACK for a signal received on the signal relay resource 1 by using the resource 2, and transmits ACK/NACK for a signal received on the resource 2 by using the resource 1. If the signal received by the UE 1 on the signal relay resource 1 or 2 is a control signal, the UE may not transmit ACK/NACK for the signal.

On the signal relay resource 1, a reception target of the UE 1 may be the UE 0, and a transmission target may be the UE 2. In addition, on the signal relay resource 2, a reception target of the UE 1 may be the UE 2, and a transmission target may be the UE 0. In this case, the UE may transmit ACK/NACK of a signal received on the relay resource 1 by using the relay resource 2, and may transmit ACK/NACK of a signal received on the relay resource 2 by using the relay resource 1. This is because it may be regarded that a signal transfer direction differs when the transmission target and the reception target are symmetrical to each other.

In addition, unlike in the aforementioned embodiment, the BS may explicitly instruct UEs to transmit ACK/NACK for the signal relay source 1 by using the signal relay resource 2, and to transmit ACK/NACK for the signal relay resource 2 by using the relay resource 1. A signal for this may be transmitted together through L2/L3 or RRC signaling while allocating the relay resource.

In addition, the BS may additionally designate a resource for transmitting ACK/NACK for a relay resource. This may be required when the UE has a signal relay resource 3 and when a transmission target and reception target of the relay resource 3 are identical to those of the relay resource 2. This is because ACK/NACK processing of the UE can be more simply performed in this manner. In addition, this is because there is a case where final destinations are different from each other even if the transmission and reception targets of the relay resources 1 and 3 are symmetrical to each other.

In addition, a PCID for retransmission is configured for each relay resource. The UE may combine and decode reception signals if physical layer control signals received on the relay resource 1 have the same PCID for retransmission.

The UE starts decoding after relaying the signal. Therefore, after relaying the signal, a physical layer control signal is decoded and then a PCID of the control signal is compared with a previously received PCID. If the PCIDs are identical, signal decoding is attempted by using a chase combining or incremental redundancy scheme.

In addition, there are two approaches for designating a target of transmitting ACK/NACK. (1) A BS designates a UE for transmitting ACK/NACK for each relay resource. (2) Alternatively, in general, since there is a high possibility that a UE which does not have a transmission target in any relay resource is a UE at a last location, a UE to which the transmission target is not allocated transmits ACK/NACK.

Sine a noise is amplified whenever relaying is performed in the amplify-and-forward scheme, it may be assumed that a reception probability of the UE at the last location is lowest. The aforementioned approach (2) is applicable under this assumption.

Figure 16:
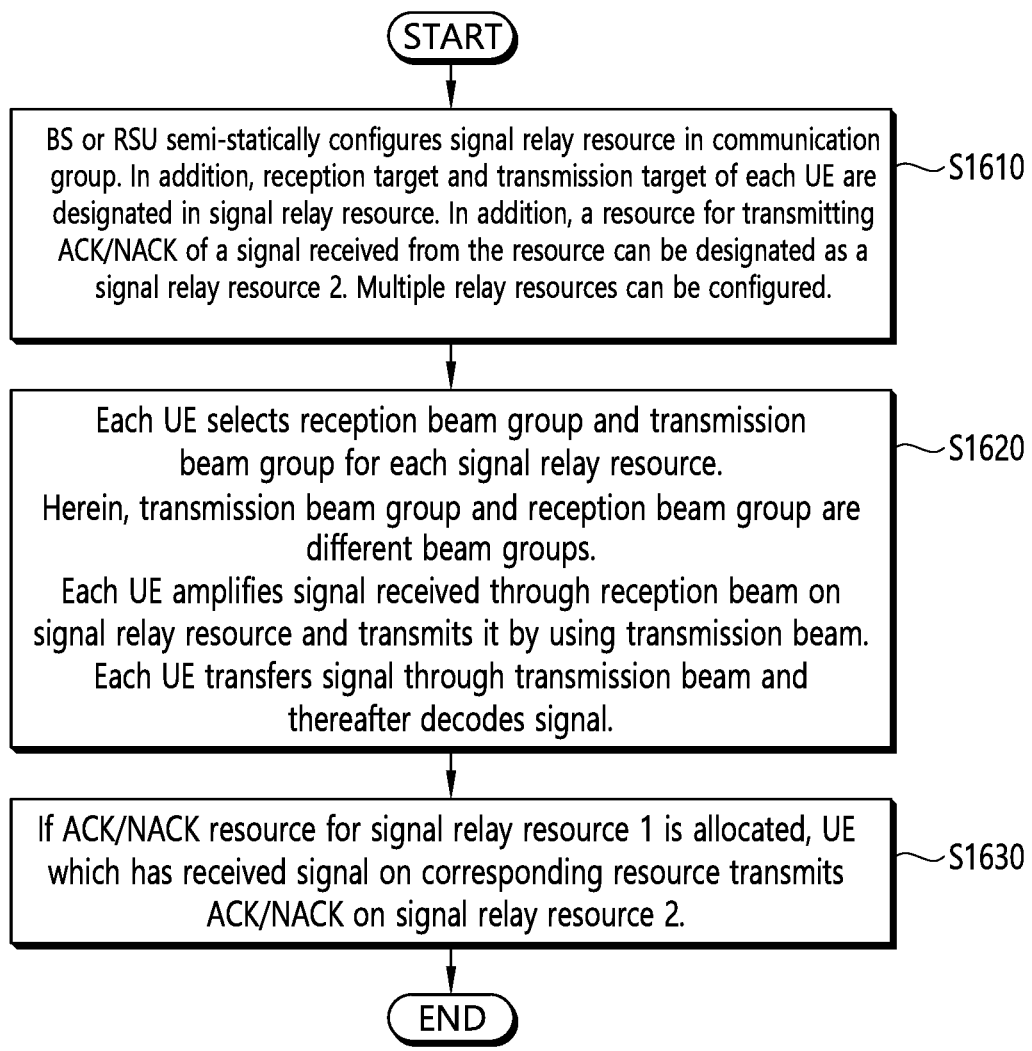
FIG. 16 is a flowchart showing a procedure of transmitting a relay signal according to an embodiment of the present specification.

FIG. 16 is a flowchart showing a procedure of transmitting a relay signal according to an embodiment of the present specification.

FIG. 16 is a main flowchart for a case of applying the aforementioned embodiment. The flowchart of FIG. 16 describes a case where an ACK/NACK transmission resource for a signal relay resource 1 is selected as a signal relay resource 2.

In step S1610, a BS or an RSU semi-statically configures the signal relay resources 1 and 2 in a communication group. In addition, a reception target and transmission target of each UE are designated in the signal relay resources 1 and 2. In addition, a resource for sending ACK/NACK of a signal received on the signal relay resource 1 may be designated as the signal relay resource 2. A plurality of signal relay resources may be configured.

In step S1620, each UE selects a reception beam group and transmission beam group for each signal relay resource. Herein, the transmission beam group and the reception beam group are different beam groups. Each UE amplifies a signal received through a reception beam on the signal relay resource and transmits it by using a transmission beam. Each UE transfers a signal through the transmission beam and thereafter decodes the signal.

In step S1630, if an ACK/NACK resource for the signal relay resource 1 is allocated, a UE which has received a signal on the signal relay resource 1 transmits ACK/NACK on the signal relay resource 2.

Hereinafter, the present specification proposes a retransmission process ID (PCID) configuration scheme which allows a UE in a communication group or a BS or an RSU to relay a signal transmitted by any UE in the communication group.

For example, a common PCID is configured in the common group. Any transmission device (UE or BS or UE-type RSU) in the communication group may transmit data by using the common PCID. A reception device (UE or BS or RSU) which has received data to which the common PCID is applied may restore data by combining signals if the received signals have the same common PCID value.

A representative scenario of applying the present embodiment includes a vehicle platoon scenario. In a platoon, a leading vehicle usually transmits platoon parameters. However, upon occurrence of an event in which a vehicle not belonging to the platoon cuts in in the middle of the platoon, a vehicle other than the leading vehicle shall also be capable of transmitting a common signal in a platoon group in order to report this. Therefore, the present invention proposes a scheme for allowing any transmission device in a communication group to be able to use a signal to which a common PCID in a group is applied.

When the common PCID consists of N bits in total, N1 bits correspond to UE identification information of an initial transmission device, and N2 bits correspond to a transport block sent by the transmission device. Herein, N1+N2=N. PCIDs corresponding to the N1 bits and the N2 bits are respectively PCID1 and PCID2.

Since any UE in a group is capable of transmitting a signal by using the common PCID, different UEs may transmit different signals by using the same PCID if there is no pre-agreed rule. In this case, the UE which has received the signal performs decoding by combining incorrect signals, and thus there is a significantly high possibility that the signal cannot be decoded. Therefore, signals sent by different transmission devices need to be separately identified to avoid collision of the common PCID. In addition, since one transmission device may transmit different transport blocks at different time points, there is a need to allocate a plurality of PCIDs to one transmission device. That is, the UE which has received the signal may use the common PCID to confirm which UE in the group has transmitted the signal by using the $PCID_1$ and confirm how many transport blocks have been transmitted so far by using the $PCID_2$.

The BS may adjust a ratio of N1 and N2 through an L2/L3 signal. In addition, the BS transfers PCID1 mapping information of a corresponding UE to each UE in the group by using the L2/L3 signal.

For example, the BS may increase N1 if the number of UEs in the communication group is great. For another example, N2 may be increased if retransmission occurs frequently in the communication group. In addition, the PCID1 mapping information may be valid only in the communication group, and a different PCID1 may be allocated to the UE in the communication group or the BS or the RSU.

For another example, if there are many UEs in the communication group, the BS may map the PCID1 to some UEs and may instruct the remaining UEs to randomly select the L2/L3 signal. In this case, the BS designates a range of the PCID1 that can be randomly selected and reports this to the UE.

Since the PCID is transmitted using the L1 control signal, it is reasonable to consider that the number of bits allocated to the PCID is constant. Therefore, the number of bits allocated for the PCID1 cannot be increased according to the number of UEs in the communication group. Accordingly, if the number of UEs that can be expressed with the PCID1 is great in the communication group, the UE needs to randomly select the PCID1.

A reception device which has received a signal to which the common PCID is applied may relay a signal. A transmission device may transmit one or more L1 control signals indicating a transport block to which the common PCID is applied in the same subframe. For example, an L1 control signal 1 may be for transferring a signal to a UE in a communication group 1, and an L1 control signal 2 may be for transferring a signal to a UE in a communication group 2. An expiration time point of the common PCID may be set differently in the L1 control signals 1 and 2. The aforementioned embodiment may be utilized when it is intended to set the number of times of relaying a signal by the reception device to be different for each group.

In addition, the common PCID expires when a designated time is over, or when a designated event occurs even before reaching the designated time.

Since information transmitted using the common PCID is information received by all UEs in the communication group and is a signal that can be relayed by any UE in the group, in many cases, it is difficult to designate a UE for receiving an ACK signal and a UE for transmitting the ACK signal. Therefore, the present embodiment proposes a case where an initial transmission device designates the expiration time point of the common PCID or a BS or RSU which can easily send a signal to all UEs in the group transmits the ACK signal.

The BS or the RSU designates a maximum holing time of the common PCID for the UE in the communication group by using the L2/L3 signal. In addition, each transmission device may randomly designate the common PCID expiration time point in the maximum holding time.

Each transmission device may transmit information regarding a time remaining until the common PCID expires through the L1 control signal. This is called an L1 control signal 1. A method of indicating the remaining time information by using the L1 control signal includes a method in which a transmission device explicitly includes the number of remaining subframes until the common PCID expires from a time point at which a reception device receives the L1 control signal 1 into the L1 control signal. If the L1 control signal indicates that the number of remaining subframes is 0, the reception device cannot relay a corresponding signal in the communication group. On the other hand, if the number of remaining subframes is greater than 0 and the reception device is capable of relaying a signal within a given time, a relay device may relay the signal.

Unlike the transport block, the L1 control signal is not restored by combining signals received by the reception device through several paths. Therefore, when the UEs 1 and 2 transmit the same transport block, a payload (information)

of the L1 control signal used by the UE and a payload of the L1 control signal used by the UE2 may differ. In addition thereto, the L1 control signal is preferably set such that a transmission bit is as shortest as possible. Therefore, the expiration time information of the common PCID is preferably set to a transmission time point of the transport block.

An L1 control signal transmitted by a reception device which intends to relay a transport block received using the common PCID is called an L1 control signal 2. In this case, the reception device generates time information of the L1 control signal 2 as follows. If it is assumed that t1 is a time index of a subframe at which the reception device receives the L1 control signal 1, n is common PCID expiration information included in the L1 control signal 1, and t2 is a time index of a subframe at which the L1 control signal 2 is transmitted, then information on the number of the remaining subframes included in the L1 control signal 2 is generated using n−(t2−t1).

Each transmission device may include common PCID expiration time information into an L2/L3 header in a transport block including data. The expiration time information may imply a subframe index designated in L2/L3 (that is, the transport block may be relayed until a specific subframe index). If t0 is a time point at which the reception device receives a corresponding transport block and t1 is a common PCID expiration time point, the reception device may relay the transport block again when t0<t1. On the contrary, the reception device cannot relay the transport block when t0>=t1.

If the common PCID expiration time information changes whenever retransmission or relaying occurs in a situation of being included in the transport block, the UE may decode a signal by combining the transport block. Therefore, when the common PCID expiration time information is included in the L2/L3 header, there is a need to designate an expiration time point from an absolute point of view. In this case, the expiration time point is indicated by a subframe index.

A case is assumed where a UE in a communication group receives a downlink L1 control signal 1 to which a common PCID is applied. UEs in the communication group, an RSU, and a BS may stop relaying of the transport block to which a corresponding common PCID is applied and regard that the common PCID expires in a case where: (1) the number of remaining subframes indicated by the downlink L1 control signal is 0; or (2) common PCID expiration time information in a transport block L1/L3 header indicated by the downlink L1 control signal is the same as a current time point. The BS or RSU which transmits the downlink L1 control signal 1 may randomly adjust the remaining time information.

Figure 17:
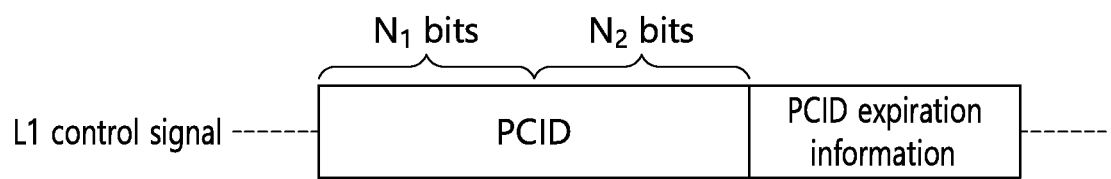
FIG. 17 shows an example of a configuration of a control signal for transmitting a common PCID in a communication group.

FIG. 17 shows an example of a configuration of a control signal for transmitting a common PCID in a communication group.

According to the aforementioned embodiment and FIG. 17, a BS transmits the common PCID and PCID expiration information to a UE in a group through an L1 control signal. The common PCID consists of $PCID_1$ corresponding to $N_1$ bits indicating UE identification information of an initial transmission device and $PCID_2$ corresponding to $N_2$ bits indicating a transport block sent by the transmission device. The PCID expiration information may correspond to information on time remaining until the common PCID expires.

In addition, in order to recognize whether a common PCID of a reception signal is applied, the reception device separately designates a temporary identifier (e.g., T-RNTI) used when the common PCID is applied, and masks the temporary identifier to cyclic redundancy check (CRC) of an L1 control signal. The temporary identifier used when the common PCID is applied may be configured differently for each communication group. A BS or an RSU transfers the temporary identifier to a UE in a group through an L2/L3 signal.

There may be a broadcasting/multicasting signal in a cell to which the common PCID is not applied. In this case, the temporary identifier for a case of applying the common PCID may be different from a temporary identifier for a case of not applying the common PCID.

The BS or the RSU transmits to all UEs in the group the temporary identifier used when transmitting the signal to which the common PCID is applied through the L2/L3 signal. However, it is not transmitted to a UE not belonging to a corresponding communication group.

The temporary identifier applied to the common PCID may be equally applied to a downlink and an inter-UE link. Therefore, when the UE receives a transport block, to which the common PCID is applied, through the downlink, it may be transmitted by applying the same common PCID through the inter-UE link.

In the present specification, unless otherwise mentioned, an L1 control signal may be transmitted through all of a downlink, an uplink, and an inter-UE link (or sidelink).

Figure 18:
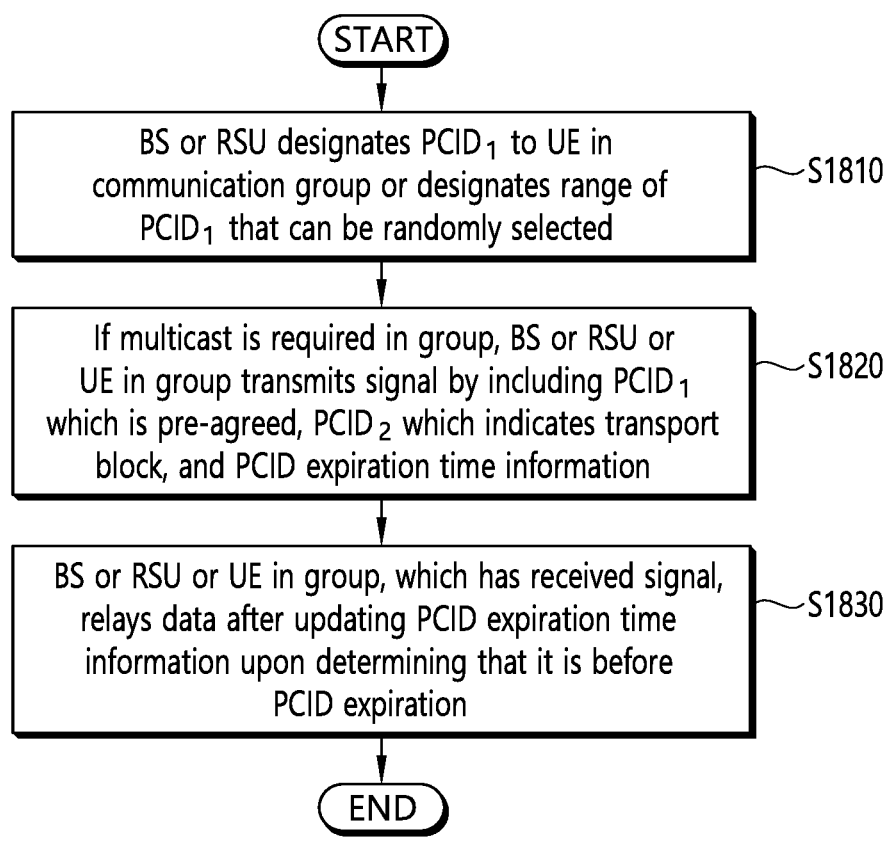
FIG. 18 is a flowchart showing a procedure of applying a common PCID according to an embodiment of the present specification.

FIG. 18 is a flowchart showing a procedure of applying a common PCID according to an embodiment of the present specification. The flowchart of FIG. 18 describes an operation of relaying data by using $PCID_1$, $PCID_2$ and PCID expiration information.

In step S1810, a BS or an RSU designates the $PCID_1$ to a UE in a communication group or designates a range of the $PCID_1$ that can be randomly selected.

In step S1820, if multicasting is required in a group, the B S or the RSU or the UE in the group transmits a signal by including the $PCID_1$ which is pre-agreed, the $PCID_2$ which indicates a transport block, and PCID expiration time information.

In step S1830, the BS or the RSU or the UE in the group, which has received the signal, relays data after updating the PCID expiration time information upon determining that it is before PCID expiration.

Figure 19:
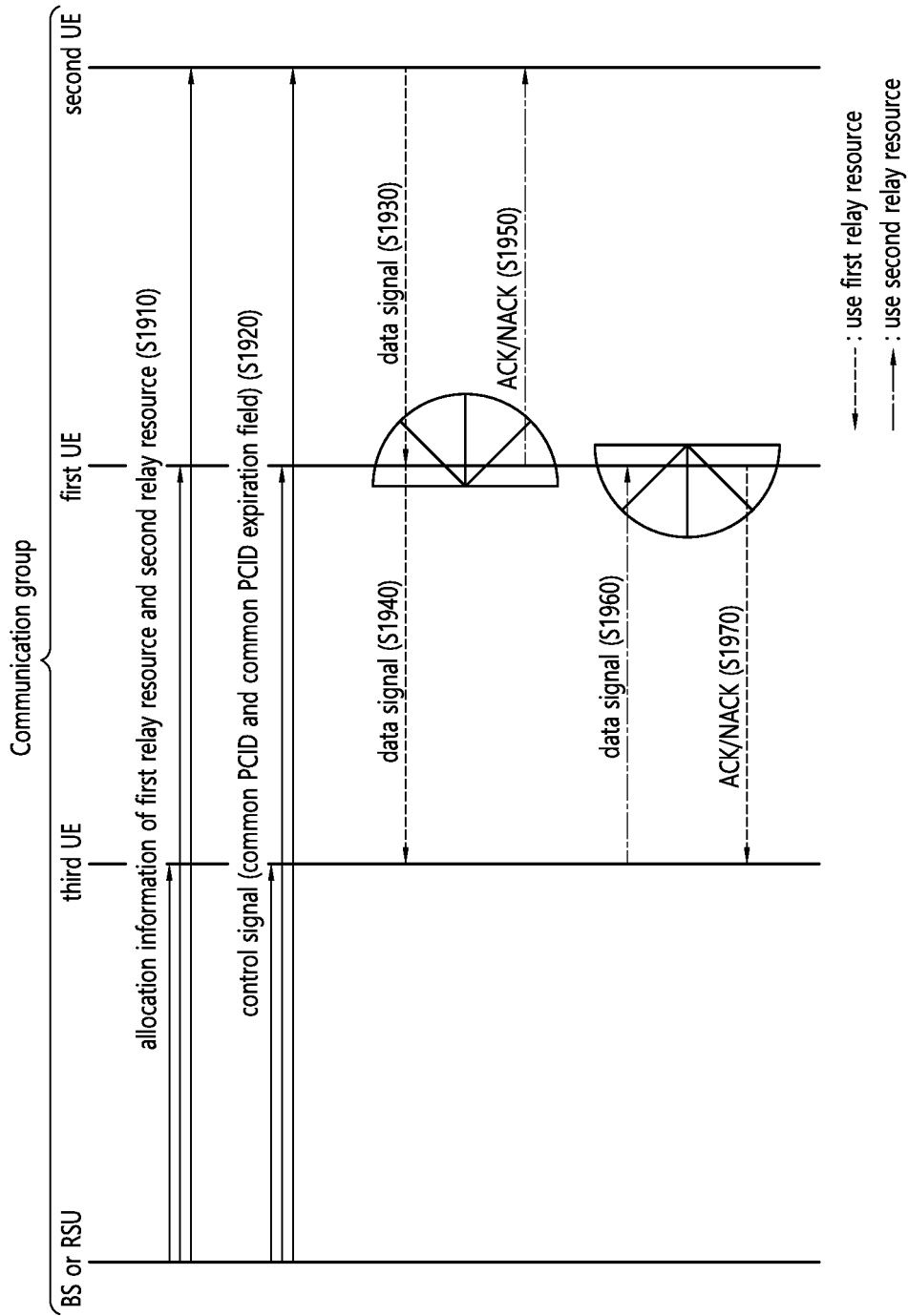
FIG. 19 shows an overall procedure for transmitting a relay signal and applying a common PCID according to an embodiment of the present specification.

FIG. 19 shows an overall procedure for transmitting a relay signal and applying a common PCID according to an embodiment of the present specification.

First, summarizing terminologies, a communication group is a group consisting of one or more UEs, and may also include a BS or a road side unit (RSU). In the present embodiment, the communication group may include a first UE, a second UE, a third UE, a BS, or an RSU. In this case, the communication group may correspond to a platoon group for V2X communication. Although a location of a vehicle is determined in the platoon in the order of the second UE, the first UE, and the third UE in the present embodiment, this is for exemplary purposes only, and thus the vehicle may be deployed variously.

In step S1910, the first UE receives allocation information of a first relay resource and second relay resource for the communication group from the BS or a communication group head. In this case, the allocation information of the first relay resource and second relay resource for the communication group may be received through UE-specific signaling or common signaling for the communication group. Since the first relay resource and the second relay resource are common in the communication group, as shown in step S1910, the BS may report the allocation information to each UE in a multicast manner. However, a direction of a transmission beam and reception beam for the first relay resource and a direction of a transmission beam and reception beam for the second relay resource may be received through UE-specific signaling. Since a reception target and a transmission target are different for each UE, the reception target and the transmission target are preferably reported separately to each UE.

When the first relay resource and the second relay resource are allocated, and when the direction of the transmission beam and reception beam for the first relay resource and the direction of the transmission beam and reception beam for the second relay beam are determined, in step S1930, the first UE receives a data signal from the second UE through a reception beam for the first relay resource.

In step S1940, the first UE transfers the data signal to the third UE through the transmission beam for the first relay resource. That is, the first UE relays to the third UE a data signal received from the second UE by using an amplify-and-forward scheme. The amplify-and-forward scheme is a scheme in which a received signal is relayed (transferred) without decoding within an OFDM CP length through only an analog stage without having to be subjected to a digital stage.

Specifically, the data signal may be amplified before being decoded by the first UE and be then transferred to the third UE (step S1940). The data signal may be decoded by the first UE after being transferred to the third UE.

In step S1950, the first UE transmits ACK/NACK for the data signal to the second UE through the transmission beam for the second relay resource. The ACK/NACK for the data signal may be transmitted after the data signal is decoded by the first UE. That is, an ACK/NACK transmission resource for the data signal received through the first relay resource is configured as the second relay resource.

In this case, the reception beam for the first relay resource is symmetrical to the transmission beam for the second relay resource. In other words, a beam used as the reception beam for the first relay resource is configured to be the same as a beam used as the transmission beam for the second relay resource. This symmetry is equally applied not only to the first UE but also to the second UE and the third UE.

In step S1960, the first UE may receive the data signal from the third UE through the reception beam for the second relay resource. In step S1970, the first UE may transmit, to the third UE, ACK/NACK for the data signal received from the third UE through the transmission beam for the first relay resource. That is, an ACK/NACK transmission resource for the data signal received through the second relay resource is configured as the first relay resource.

In this case, the transmission beam for the first relay resource is symmetrical to the reception beam for the second relay resource. In other words, a beam used as the transmission beam for the first relay resource is configured to be the same as a beam used as the reception beam for the second relay resource. This symmetry is equally applied not only to the first UE but also to the second UE and the third UE.

In addition, the first UE may periodically receive a reference signal from the BS. The direction of the transmission beam and reception beam for the first relay resource may be updated based on the reference signal.

In addition, the first relay resource and the second relay resource may be periodically allocated by applying frequency hopping. A long cyclic prefix (CP) may be applied to each of the first relay resource and the second relay resource, and a last orthogonal frequency division multiplexing (OFDM) symbol may be null.

In addition, in step S1920, the first UE may receive a control signal including a common process ID (PCID) and common PCID expiration field for the communication group from the BS or a fourth UE in the communication group or a UE-type road side unit (RSU). Since the common PCID is also common in the communication group, as shown in step S1920, the B S may report the control signal to each UE in a multicast manner. The fourth UE in the communication group may correspond to a UE other than the first UE, second UE, and fourth UE in the communication group.

The common PCID expiration field may indicate the number of subframes remaining from a subframe at which the control signal is received until a subframe at which the common PCID expires.

In this case, the data signal may be received from the second UE by using the common PCID. If the common PCID expiration field indicates that the number of remaining subframes is 0, the data signal may not be transferred to the third UE. If the common PCID expiration field indicates that the number of remaining subframes is greater than 0, the data signal may be transferred to the third UE by using the common PCID. That is, whether to relay the data signal may be determined according to whether the PCID expires.

In addition, the common PCID may include a first PCID bit indicating identification information of a UE which initially transmits the data signal and a second PCID bit indicating a transport block of the data signal. That is, the first UE which has received the data signal may use the common PCID to confirm which UE in the communication group has transmitted the signal by using a first PCID bit and confirm how many transport blocks have been transmitted so far by using a second PCID.

In addition, the first UE may de-mask a cyclic redundancy check (CRC) of the control signal by using a temporary identifier for identifying the common PCID for the communication group. This is because the temporary identifier separately designated by the BS is transmitted by being masked with the CRC of the control signal. The temporary identifier may be set to be different for each communication group.

Figure 20:
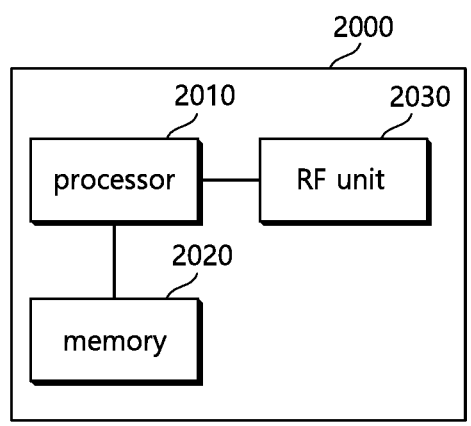
FIG. 20 is a block diagram showing an apparatus to which the present specification is applied.

FIG. 20 is a block diagram showing an apparatus for wireless communication for implementing an embodiment of the present invention.

An apparatus 2000 for wireless communication includes a processor 2010, a memory 2020 and a radio frequency (RF) unit 2030.

The processor 2010 may be configured to implement proposed functions, procedures and/or methods described in this description. Layers of the radio interface protocol may be implemented in the processor 2010. The processor 2010 may handle a procedure explained above. The memory 2020 is operatively coupled with the processor 2010, and the RF unit 2030 is operatively coupled with the processor 2010.

The processor 2010 may include application-specific integrated circuit (ASIC), other chipset, logic circuit and/or data processing device. The memory 2020 may include read-only memory (ROM), random access memory (RAM), flash memory, memory card, storage medium and/or other storage device. The RF unit 2030 may include baseband circuitry to process radio frequency signals. When the embodiments are implemented in software, the techniques described herein can be implemented with modules (e.g., procedures, functions, and so on) that perform the functions described herein. The modules can be stored in memory 2020 and executed by processor 2010. The memory 2020 can be implemented within the processor 2010 or external to the processor 2010 in which case those can be communicatively coupled to the processor 2010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present DISCLOSURE.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of transmitting a relay signal for vehicle to everything (V2X) communication in a wireless communication system, the method comprising:
   receiving, by a first terminal, allocation information of a first relay resource and second relay resource for a communication group from a base station or a communication group head, wherein the communication group comprises the first terminal, a second terminal, and a third terminal;
   wherein the first terminal receives a data signal from the second terminal through a reception beam for the first relay resource,
   transferring, by the first terminal, the data signal to the third terminal through a transmission beam for the first relay resource; and
   transmitting, by the first terminal, ACK/NACK for the data signal to the second terminal through a transmission beam for the second relay resource,
   wherein the reception beam for the first relay resource is symmetrical to the transmission beam for the second relay resource,
   wherein the transmission beam for the first relay resource is symmetrical to a reception beam for the second relay resource,
   wherein the first relay resource and the second relay resource are periodically allocated by applying frequency hopping, and
   wherein a cyclic prefix (CP) is applied to each of the first relay resource and the second relay resource, and a last orthogonal frequency division multiplexing (OFDM) symbol is null.

2. The method of claim 1,
   wherein the data signal is amplified before being decoded by the first terminal and is transferred to the third terminal;
   wherein the data signal is decoded by the first terminal after being transferred to the third terminal; and
   wherein ACK/NACK for the data signal is transmitted after the data signal is decoded by the first terminal.

3. The method of claim 1,
   wherein the allocation information of the first relay resource and second relay resource for the communication group are received through terminal-specific signaling or common signaling for the communication group, and
   wherein a direction of a transmission beam and reception beam for the first relay resource and a direction of a transmission beam and reception beam for the second relay resource are received through terminal-specific signaling.

4. The method of claim 3, further comprising receiving, by the first terminal, a reference signal periodically from the base station, wherein the direction of the transmission beam and reception beam for the first relay resource is updated based on the reference signal.

5. The method of claim 1, further comprising:
   transmitting, by the first terminal to the third terminal, ACK/NACK for the data signal received from the third terminal through the transmission beam for the first relay resource, wherein the first terminal receives the data signal through the reception beam for the second relay resource from the third terminal.

6. The method of claim 1, further comprising:
   receiving, by the first terminal, a control signal comprising a common process ID (PCID) and common PCID expiration field for the communication group from the base station or a fourth terminal in the communication group or a terminal-type road side unit (RSU),
   wherein the common PCID expiration field indicates the number of subframes remaining from a subframe at which the control signal is received until a subframe at which the common PCID expires, and
   wherein the data signal is received from the second terminal by using the common PCID.

7. The method of claim 6,
   wherein the common PCID expiration field includes information that the number of remaining subframes is greater than 0, and
   wherein the data signal is transferred to the third terminal by using the common PCID.

8. The method of claim 6, wherein the common PCID comprises a first PCID bit indicating identification information of a terminal which initially transmits the data signal and a second PCID bit indicating a transport block of the data signal.

9. The method of claim 6, further comprising:
   de-masking, by the first terminal, a cyclic redundancy check (CRC) of the control signal by using a temporary identifier for identifying the common PCID for the communication group, wherein the temporary identifier is set to be different for each communication group.

10. A first terminal for transmitting a relay signal for vehicle to everything (V2X) communication in a wireless communication system, the first terminal comprising:
    a transmitter and a receiver for transmitting and receiving a radio signal; and
    a processor operatively coupled to the transmitter and receiver, wherein the processor is configured such that:
    a first terminal receives allocation information of a first relay resource and second relay resource for a communication group from a base station or a communication group head, wherein the communication group comprises the first terminal, a second terminal, and a third terminal; and
    wherein the first terminal receives a data signal from the second terminal through a reception beam for the first relay resource, the first terminal transfers the data signal to the third terminal through a transmission beam for the first relay resource; and the first terminal transmits ACK/NACK for the data signal to the second terminal through a transmission beam for the second relay resource, wherein the reception beam for the first relay resource is symmetrical to the transmission beam for the second relay resource, wherein the transmission beam for the first relay resource is symmetrical to a reception beam for the second relay resource, wherein the first relay resource and the second relay resource are periodically allocated by applying frequency hopping, and wherein a cyclic prefix (CP) is applied to each of the first relay resource and the second relay resource, and a last orthogonal frequency division multiplexing (OFDM) symbol is null.

11. The first terminal of claim 10,
wherein the data signal is amplified before being decoded by the first terminal and is transferred to the third terminal;
wherein the data signal is decoded by the first terminal after being transferred to the third terminal; and
wherein ACK/NACK for the data signal is transmitted after the data signal is decoded by the first terminal.

12. The first terminal of claim 10,
wherein the allocation information of the first relay resource and second relay resource for the communication group is received through terminal-specific signaling or common signaling for the communication group, and
wherein a direction of a transmission beam and reception beam for the first relay resource and a direction of a transmission beam and reception beam for the second relay resource are received through terminal-specific signaling.

13. The first terminal of claim 12,
wherein the processor is configured to receive a reference signal periodically from the base station, and
wherein the direction of the transmission beam and reception beam for the first relay resource are updated based on the reference signal.

14. The first terminal of claim 10, wherein the first terminal receives the data signal through the reception beam for the second relay resource from the third terminal, the processor is configured to transmit to the third terminal, ACK/NACK for the data signal received from the third terminal through the transmission beam for the first relay resource.

15. The first terminal of claim 10,
wherein the processor is further configured to receive a control signal comprising a common process ID (PCID) and common PCID expiration field for the communication group from the base station or a fourth terminal in the communication group or a terminal-type road side unit (RSU),
wherein the common PCID expiration field indicates the number of subframes remaining from a subframe in which the control signal is received until a subframe in which the common PCID expires, and
wherein the data signal is received from the second terminal by using the common PCID.

16. The first terminal of claim 15,
wherein the common PCID expiration field indicates that the number of remaining subframes is greater than 0, and
wherein the data signal is transferred to the third terminal by using the common PCID.

17. The first terminal of claim 15, wherein the common PCID comprises a first PCID bit indicating identification information of a terminal which initially transmits the data signal and a second PCID bit indicating a transport block of the data signal.

18. The first terminal of claim 15,
wherein the processor is configured to de-mask a cyclic redundancy check (CRC) of the control signal by using a temporary identifier for identifying the common PCID for the communication group, and
wherein the temporary identifier is set to be different for each communication group.

* * * * *